US012047730B2

(12) United States Patent
Zhang et al.

(10) Patent No.: US 12,047,730 B2
(45) Date of Patent: Jul. 23, 2024

(54) LOUDSPEAKER APPARATUS

(71) Applicant: SHENZHEN SHOKZ CO., LTD., Guangdong (CN)

(72) Inventors: Lei Zhang, Shenzhen (CN); Yongjian Li, Shenzhen (CN); Wenbing Zhou, Shenzhen (CN); Jinbo Zheng, Shenzhen (CN); Zhuyang Jiang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 135 days.

(21) Appl. No.: 17/806,258

(22) Filed: Jun. 9, 2022

(65) Prior Publication Data

US 2022/0303665 A1 Sep. 22, 2022

Related U.S. Application Data

(63) Continuation of application No. 17/098,440, filed on Nov. 15, 2020, now Pat. No. 11,438,689, which is a (Continued)

(30) Foreign Application Priority Data

Jan. 5, 2019 (CN) ........................ 201910009909.6

(51) Int. Cl.
*H04R 1/10* (2006.01)
*H04R 1/06* (2006.01)

(Continued)

(52) U.S. Cl.
CPC ............ *H04R 1/1075* (2013.01); *H04R 1/06* (2013.01); *H04R 1/1016* (2013.01); *H04R 1/105* (2013.01);

(Continued)

(58) Field of Classification Search
CPC ...... H04R 1/10; H04R 1/1016; H04R 1/1041; H04R 1/105; H04R 1/1058; H04R 1/1066;

(Continued)

(56) References Cited

U.S. PATENT DOCUMENTS 7,150,526 B2 * 12/2006 Jannard ................ H04R 1/1066 351/158
8,891,792 B2 11/2014 Qi et al.
2013/0163791 A1 * 6/2013 Qi ............................ H04R 9/02 381/151
2013/0329903 A1 * 12/2013 Ting ..................... H04B 5/0006 381/74

(Continued)

FOREIGN PATENT DOCUMENTS

CN 103079135 A 5/2013
CN 203057431 U 7/2013

(Continued)

OTHER PUBLICATIONS

International Search Report in PCT/CN2019/102381 mailed on Nov. 28, 2019, 7 pages.
Written Opinion in PCT/CN2019/102381 mailed on Nov. 28, 2019, 7 pages.

*Primary Examiner* — Thang V Tran
(74) *Attorney, Agent, or Firm* — METIS IP LLC

(57) ABSTRACT

The present disclosure discloses a loudspeaker apparatus. The loudspeaker may include: a support connector configured to contact a head of a human; at least one loudspeaker component including an earphone core and a housing for accommodating the earphone core, wherein the housing is fixedly connected to the support connector and has at least one key module; a control circuit or a battery that is contained in the support connection, wherein the earphones core is driven by the control circuit or the battery to vibrate (Continued)

to generate sound. The sound includes at least two resonance peaks. The loudspeaker apparatus may optimize the transmission efficiency of the sound, increase sound volume, and improve user experience.

19 Claims, 22 Drawing Sheets

Related U.S. Application Data continuation of application No. PCT/CN2019/102381, filed on Aug. 24, 2019.

(51) Int. Cl.

| | |
|---|---|
| ***H04R 5/033*** | (2006.01) |
| ***H04R 9/02*** | (2006.01) |
| ***H04R 9/06*** | (2006.01) |

(52) U.S. Cl.

CPC ......... *H04R 1/1066* (2013.01); *H04R 1/1091* (2013.01); *H04R 5/0335* (2013.01); *H04R 9/02* (2013.01); *H04R 9/06* (2013.01); *H04R 1/1041* (2013.01); *H04R 2201/109* (2013.01); *H04R 2420/07* (2013.01); *H04R 2460/13* (2013.01)

(58) Field of Classification Search

CPC ................ H04R 1/1075; H04R 1/1091; H04R 5/0335; H04R 9/02; H04R 9/06; H04R 2201/109; H04R 2420/07; H04R 2460/13; H04R 1/06

See application file for complete search history.

(56) References Cited

U.S. PATENT DOCUMENTS

| | | | | |
|---|---|---|---|---|
| 2017/0318379 | A1* | 11/2017 | Bullen | H04R 3/04 |
| 2019/0014425 | A1* | 1/2019 | Liao | H04R 25/606 |
| 2019/0189106 | A1* | 6/2019 | Hull | H04R 1/1008 |

FOREIGN PATENT DOCUMENTS

| | | | | |
|---|---|---|---|---|
| CN | 204948312 | U | 1/2016 | |
| CN | 204948313 | U | 1/2016 | |
| CN | 205336486 | U | 6/2016 | |
| CN | 205726269 | U | 11/2016 | |
| CN | 206650818 | U | 11/2017 | |
| CN | 107454492 | A | 12/2017 | |
| CN | 107682773 | A | 2/2018 | |
| CN | 207070263 | U | 3/2018 | |
| CN | 108391213 | A | 8/2018 | |
| CN | 108429975 | A | 8/2018 | |
| CN | 207744106 | U | 8/2018 | |
| JP | 2004229147 | A | 8/2004 | |
| KR | 101782435 | B1 | 9/2017 | |
| WO | WO-2017024595 | A1 * | 2/2017 | G02C 11/00 |

* cited by examiner

LOUDSPEAKER APPARATUS

CROSS-REFERENCE TO RELATED APPLICATIONS

This application is a Continuation of U.S. application Ser. No. 17/098,440, filed on Nov. 15, 2020, which is a Continuation of International Application No. PCT/CN2019/102381, filed on Aug. 24, 2019, which claims priority of Chinese Application No. 201910009909.6, filed on Jan. 5, 2019, the entire contents of each of which are incorporated herein by reference.

TECHNICAL FIELD

The present disclosure relates to the field of a loudspeaker apparatus, and in particular, to a key module in a loudspeaker apparatus.

BACKGROUND

At present, a loudspeaker component of a loudspeaker apparatus may include a key module and/or an auxiliary key module, which may let a user to perform some specific functions. Corresponding functions (e.g., pausing/playing music, answering calls, etc.) may be achieved through the key module and/or the auxiliary key module. However, when the key module and/or the auxiliary key module is disposed on the loudspeaker component may affect the working state of the loudspeaker component has not considered. For example, the key module may reduce the volume generated by the loudspeaker component.

SUMMARY

One aspect of the present disclosure provides a loudspeaker apparatus. The loudspeaker apparatus may include: a support connector configured to contact a head of a human; at least one loudspeaker component including an earphone core and a housing for accommodating the earphone core, wherein the housing is fixedly connected to the support connector and has at least one key module; and a control circuit or a battery that is contained in the support connector, wherein the earphone core is driven by the control circuit or the battery to vibrate to generate sound, and the sound includes at least two resonance peaks.

BRIEF DESCRIPTION OF THE DRAWINGS

The present disclosure is further described in terms of exemplary embodiments. These exemplary embodiments are described in detail with reference to the drawings. These examples are non-limiting exemplary embodiments, in which like reference numerals represent similar structures throughout the several views of the drawings, and where.

DETAILED DESCRIPTION

Figure 1:
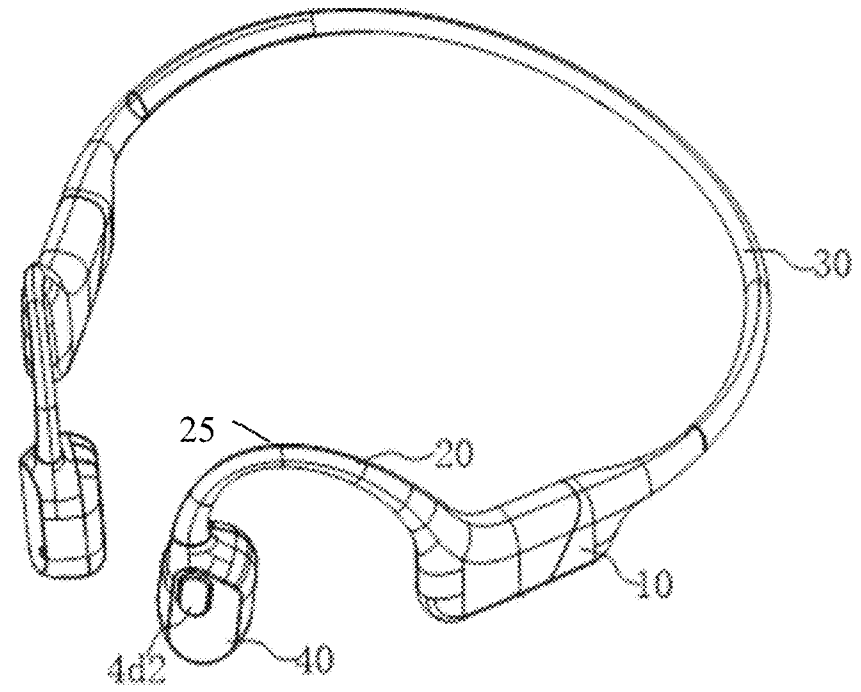
FIG. 1 is a structural schematic diagram illustrating an exemplary loudspeaker apparatus according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless apparent from the locale or otherwise stated, like reference numerals represent similar structures or operations throughout the several views of the drawings.

As used in the disclosure and the appended claims, the singular forms "a," "an," and/or "the" may include plural forms unless the content clearly indicates otherwise. In general, the terms "comprise" and "include" are indicated to include steps and elements that have been clearly identified, and these steps and elements do not constitute an exclusive list. The methods or devices may also include other steps or elements. The term "based on" refers to "at least in part based on." The term "one embodiment" refers to "at least one embodiment," and the term "another embodiment" refers to "at least one another embodiment." Definitions of other terms will be given in the description below. In the following, without loss of generality, in the description of the present disclosure regarding conduction-related technologies, a description of "loudspeaker apparatus" or "loudspeaker" will be used. The description of "loudspeaker apparatus" or "loudspeaker" is only a form of application of conduction. For those skilled in the art, "loudspeaker apparatus" or "loudspeaker" can also be replaced by other similar words, such as "sound apparatus," "hearing aid" or "speak apparatus." In fact, various implementations in the present disclosure may be easily applied to other non-loudspeaker-type hearing devices. For example, for those skilled in the art, after understanding the basic principle of the loudspeaker apparatus, various modifications and changes can be made in the form and details of the specific ways and steps of implementing the loudspeaker apparatus without departing from the principle. In particular, a function for picking up and processing environmental sound is added to the loudspeaker apparatus, so that the loudspeaker apparatus achieves the function of a hearing aid. For example, microphones may pick up environmental sound surrounding a user/wearer, process the sound (e.g., generating electrical signals) with a certain algorithm, and send the processed sound (e.g., the generated electrical signal) to a loudspeaker module. That is, the loudspeaker apparatus may be modified to include the function of picking up environmental sound, and after a certain signal processing, the sound is transmitted to the user/wearer through the loudspeaker module. In some embodiments, the algorithm mentioned above may include noise elimination, automatic gain control, acoustic feedback suppression, wide dynamic range compression, active environment recognition, active anti-noise, directional processing, tinnitus processing, multi-channel wide dynamic range compression, active howling suppression, volume control, or the like, or any combination thereof.

Figure 2:
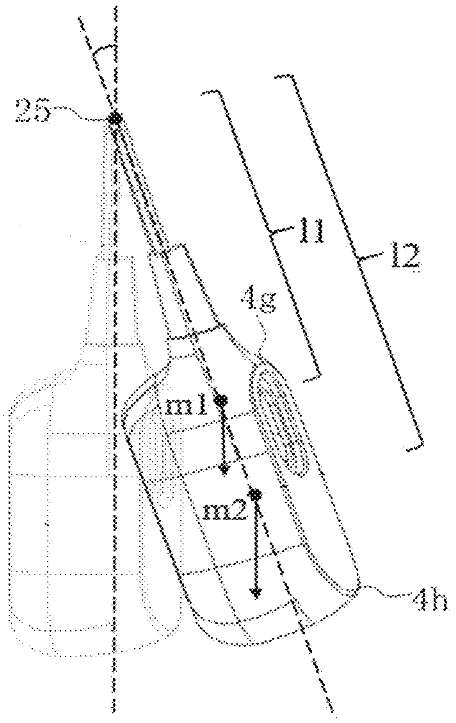
FIG. 2 is a structural schematic diagram illustrating an exemplary loudspeaker component according to some embodiments of the present disclosure.

Referring to FIGS. 1 and 2, FIG. 1 is a structural schematic diagram illustrating an exemplary loudspeaker apparatus according to some embodiments of the present disclosure; and FIG. 2 is a structural schematic diagram illustrating an exemplary loudspeaker component of a loudspeaker apparatus according to some embodiments of the present disclosure. Sound may be transmitted to an auditory system of a human (or a user) through the loudspeaker apparatus in a way of bone conduction and/or air conduction, so that the human (or the user) can hear the sound. In some embodiments, the loudspeaker apparatus may include a support connector 10 and at least one loudspeaker 40 assembly disposed on the support connector 10.

In some embodiments, the support connector 10 may include an ear hook 20. Specifically, the support connector 10 may include two ear hooks 20 and a rear hook 30 connecting the two ear hooks 20. When the user wears the loudspeaker apparatus, the two ear hooks 20 may correspond to (or contact) the left and right ears of the user, respectively, and the rear hook 30 may correspond to (or contact) the back of the user's head. The ear hook may be configured to contact to a head of the human (e.g., the user), and one or more contact points between the ear hook 20 and the head of the human (i.e., one or more points near a top of the ear hook 25) may be regarded as vibration fulcrums of the loudspeaker component 40 when the loudspeaker component 40 vibrates.

In some embodiments, the vibration of the loudspeaker component 40 can be regarded as a reciprocating swing with the top of the ear hook 25 as a fixed point, and a part of the ear hook 20 between the top of the ear hook 25 and the loudspeaker component 40 as an arm. The fixed point may be considered as a vibration fulcrum. The amplitude (i.e., vibration acceleration) of the loudspeaker component 40 may be positively related to the volume that the loudspeaker component 40 generates. A mass distribution of the loudspeaker component 40 may have a significant effect on the amplitude of the reciprocating swing, thereby affecting the volume generated by the loudspeaker component 40.

In some embodiments, the loudspeaker component 40 may include a loudspeaker module (not shown in FIG. 1) and a key module 4*d*. In some embodiments, two loudspeaker modules may be set respectively in the two loudspeaker components 40 on the left side and right side of the loudspeaker apparatus. In some embodiments, the loudspeaker module may be a part of the loudspeaker component 40 in addition to the key module 4*d*, including, for example, an earphone core and a housing.

In some embodiments, the key module 4*d* may be used for human-computer interaction. For example, the key module 4*d* may be used for implementing a pause/start function, a recording function, a call answering function, etc.

Specifically, the user may use the key module 4*d* to implement different interaction functions by operating the key module 4*d* with operation instructions. For example, the user may click the key module 4*d* once to implement the pause/start (such as music, recording, etc.) function. As another example, the user may click the key module 4*d* twice quickly to implement the call answering function. As a further example, the user may regularly click (e.g., for a total of twice clicks, clicking every other second) the key module 4*d* to implement the recording function. In some embodiments, the operation instructions performed by the user may include clicking, sliding, scrolling, or the like, or any combination thereof. For example, the user may slide up and down on a surface of the key module 4*d* to implement the function of switching songs.

In an application scenario, at least two key modules 4*d* may be set respectively on the left and right ear hooks 20. The user may use the left and/or right hands to operate either of the two key modules 4*d*, which may improve user experience.

In some embodiments, in order to further improving the human-computer interaction experience, the functions of the human-computer interaction may be assigned separately to the two key modules 4*d* on the left and right. The user may operate the corresponding key modules 4*d* according to different functions that the user wants to implement. For example, for the key module 4*d* on the left, the user may turn on recording function by clicking once; turn off the recording function by clicking twice; implementing the pause/play function by quickly clicking twice. As another example, for the key module 4*d* on the right, the user may implement the call answering function by quickly clicking twice (if music is playing at this time and there is no phone call, the function of switching to the next/previous song may be achieved by quickly clicking twice).

In some embodiments, the functions corresponding to the left and right key modules 4*d* may be user-defined. For example, the user may assign, in an application software, the pause/play function performed by the left key module 4*d* to the right key module 4*d*. As another example, the call answering function performed by the right key module 4*d* may be assigned to the left key module 4*d*. Further, for operating instructions (such as clicking times, sliding gestures) to be used to implement corresponding functions may be set in the application software by the user. For example, by setting data in the application software, the operation instruction corresponding to the call answering function may be changed from clicking once to clicking twice, and the operation instruction corresponding to the function of switching to the next/previous song may be changed from clicking twice to clicking three times. The user defines the function of the key module 4*d* may be more compliance with the operation habits of the user, which may be helpful to avoid operation errors and improve the user experience.

In some embodiments, the functions of the human-computer interaction may not be fixed, and may be determined according to functions commonly used by the user. For example, the key module 4*d* may also implement functions such as rejecting calls and reading voice messages, and the user may customize the functions and operation instructions corresponding to the functions to satisfy different requirements.

In some embodiments, a distance between a center of the key module 4*d* and a vibration fulcrum may not be greater than a distance between a center of the loudspeaker module and the vibration fulcrum. Thus, this structure may increase the vibration acceleration of the loudspeaker component 40, which may further increase the volume of the loudspeaker component 40 when vibrating.

In some embodiments, the center of the key module 4*d* may be a center of mass m1 or a center of form g1. There may be a first distance I1 between the center of mass m1 or the center of form g1 of the key module 4*d* and the top of the ear hook 25 (i.e., the vibration fulcrum). There may be a second distance I2 between a center of mass m2 or a center of form g2 of the loudspeaker module (the rest portion of the loudspeaker component 40 except the key module 4*d*) and the top of the ear hook 25. It should be noted that the center of mass or the center of form of the loudspeaker module may also be replaced by the center of mass or the center of form of the housing.

In some embodiments, the mass distribution of the key module 4*d* and/or the loudspeaker module may be relatively uniform. Thus, it can be considered that the center of mass m1 of the key module 4*d* coincides with the center of form g1 of the key module 4*d*, and the center of mass m2 of the loudspeaker module coincides with the center of form g2 of the loudspeaker module.

In some embodiments, the mass distribution of the key module 4*d* in the loudspeaker component 40 may be represented by a ratio between the first distance I1 and the second distance I2, and/or a mass ratio k between the mass of the key module 4*d* and the mass of the loudspeaker module.

Specifically, according to the principle of dynamics, compare to the proximal end 4*g* of the top of the ear hook 25, when the key module 4*d* is set at the distal end 4*h* of the top of the ear hook 25, the vibration acceleration of the loudspeaker component 40 may be less, which may cause the volume down. In a case where the mass of the key module 4*d* is constant, as the ratio between the first distance I1 and the second distance I2 increases, the vibration acceleration of the loudspeaker component 40 decreases, which may cause the volume down. In a case where the ratio between the first distance I1 and the second distance I2 is constant, as the mass of the key module 4*d* increases, the vibration acceleration of the loudspeaker component 40 decreases, which may cause the volume down. Therefore, by adjusting the ratio between the first distance I1 and the second distance I2 and/or the mass ratio k between the mass of the key module 4*d* and the mass of the loudspeaker module, the volume down of the loudspeaker component 40 caused by the setting of the key module 4*d* may be controlled within the range perceivable by human ears.

In some embodiments, the ratio between the first distance I1 and the second distance I2 may not be greater than 1.

Specifically, when the ratio between the first distance I1 and the second distance I2 is equal to 1, the center of mass m1 or the center of form g1 of the key module 4*d* may coincide with the center of mass m2 or the center of form g2 of the loudspeaker module, so that the key module 4*d* may be set centrally at the loudspeaker component 40. When the ratio between the first distance I1 and the second distance I2 is less than 1, the center of mass m1 or the center of form g1 of the key module 4*d* may be closer to the top of the ear hook 25 than the center of mass m2 or the center of form g2 of the loudspeaker module, and thus, the key module 4*d* is disposed at the proximal end of the loudspeaker component 40 near the top of the ear hook 25. As the ratio between the first distance I1 and the second distance I2 becomes smaller, the center of mass m1 or the center of form g1 of the key module 4*d* may be closer to the top of the ear hook 25 than the center of mass m2 or the center of form g2 of the loudspeaker module.

In some embodiments, the ratio between the first distance I1 and the second distance I2 may not be greater than 0.95, so that the key module 4*d* is closer to the top of the ear hook 25. In some embodiments, the ratio between the first distance I1 and the second distance I2 may be 0.9, 0.8, 0.7, 0.6, 0.5, etc., which may be determined according to different requirements, and is not limited here.

Further, in a case where the ratio between the first distance I1 and the second distance I2 satisfies the above conditions, the mass ratio between the mass of the key module 4*d* and the mass of the loudspeaker module may not be greater than 0.3, 0.29, 0.23, 0.17, 0.1, 0.06, 0.04, etc., which is not limited here.

It should be noted that, in the one or more embodiments described above, the center of mass m1 of the key module 4*d* may coincide with the center of form g1 of the key module (not shown in FIG. 2), that is, they are located at the same point. The center of mass m2 of the loudspeaker module may coincide with the center of form g2 of the loudspeaker module (not shown in FIG. 2), that is, they are located at the same point. The premise of being located at the same point is that the mass distribution of the key module 4*d* and/or the loudspeaker module is relatively uniform.

In some embodiments, the center of mass m1 and the center of form g1 of the key module 4*d* may not coincide. Specifically, since the structure of the key module 4*d* is relatively simple and regular, it is easier to determine the center of form g1 than the center of mass m1, and thus the center of form g1 may be selected as a reference point. The center of mass m2 and center of form g2 of the loudspeaker module may not coincided. Due to different materials used in the loudspeaker module (such as microphones, flexible circuit boards, pads, etc. are made of different materials), the mass distribution may not be uniform, and the shape of each component may be irregular (such as microphones, flexible circuit boards, pads, etc.). Therefore, the center of mass m2 of the loudspeaker module may be used as a reference point.

In an application scenario, corresponding to the embodiments mentioned above, there may be a first distance I1 between the center of form g1 of the key module 4*d* and the top of the ear hook 25, and a second distance I2 between the center of mass m2 of the loudspeaker module and the top of the ear hook 25. The mass distribution of the key module 4*d* in the loudspeaker component 40 can be represented by the ratio between the first distance I1 and the second distance I2, and/or the mass ratio k between the mass of the key module 4*d* and the mass of the loudspeaker module. Specifically, in a case where the mass of the key module 4*d* is constant, as the ratio between the first distance I1 and the second distance I2 increases, the vibration acceleration of the loudspeaker component 40 decreases, thereby causing the volume down. In a case where the ratio between the first distance I1 and the second distance I2 is constant, as the mass of the key module 4*d* increases, the vibration acceleration of the speaker component 40 decreases, thereby causing the volume down. Therefore, by adjusting the ratio between the first distance I1 and the second distance I2 and/or the mass ratio k between the mass of the key module 4*d* and the mass of the loudspeaker module, the volume down caused by the setting of the key module 4*d* may be controlled within the range perceivable by human ears.

In an application scenario, the ratio between the first distance I1 and the second distance I2 may not be greater than 1.

Specifically, when the ratio between the first distance I1 and the second distance I2 is equal to 1, the center of form g1 of the key module 4*d* and the center of mass m2 of the loudspeaker module may coincide, so that the key module 4*d* is centered relative to the loudspeaker component 40. When the ratio between the first distance I1 and the second distance I2 is less than 1, the center of form g1 of the key module 4*d* may be closer to the top of the ear hook 25 relative to the center of mass m2 of the loudspeaker module, and thus, the key module 4*d* is disposed at the proximal end 4*g* of the loudspeaker component 40 near the top of the ear hook 25. As the ratio between the first distance I1 and the second distance I2 becomes smaller, the center of form g1 of the key module 4*d* may be closer to the top of the ear hook 25 relative to the center of mass m2 of the loudspeaker component 40.

Further, the ratio between the first distance I1 and the second distance I2 may not be greater than 0.95, so that the key module 4*d* may be closer to the top of the ear hook 25. The ratio between the first distance I1 and the second distance I2 may be 0.9, 0.8, 0.7, 0.6, 0.5, etc., which may be determined according to different requirements, and is not limited here.

Still further, in a case where the ratio between the first distance I1 and the second distance I2 satisfies the range mentioned above, the mass ratio between the mass of the key module 4*d* and the mass of the loudspeaker module may not be greater than 0.3, 0.29, 0.23, 0.17, 0.1, 0.06, 0.04, etc., which is not limited here.

It should be noted that, in another embodiment, the center of form g2 of the loudspeaker module may be used as a reference point. The descriptions herein may be similar to the previous embodiments and will not be repeated.

Figure 3:
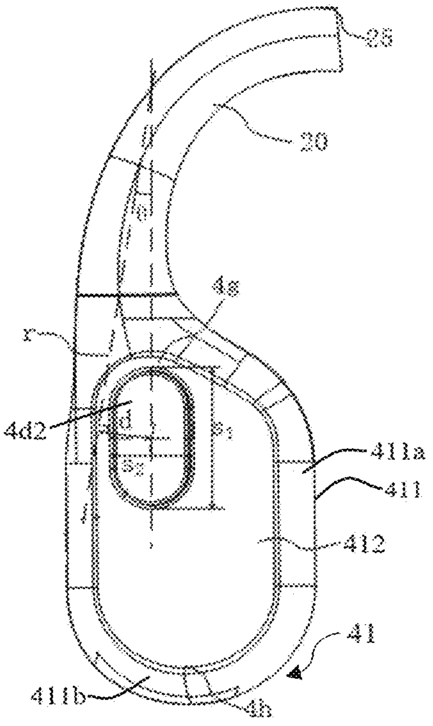
FIG. 3 is a structural schematic diagram illustrating a second view of the loudspeaker component according to some embodiments of the present disclosure.

FIG. 3 is a structural schematic diagram illustrating a second view of the loudspeaker component of the loudspeaker apparatus according to some embodiments of the present disclosure. In some embodiments, the loudspeaker module may include an earphone core for generating sound and a housing 41 for accommodating the earphone core.

In some embodiments, the housing 41 may include an outer sidewall 412 and a peripheral sidewall 411. The peripheral sidewall 411 may be connected to the outer sidewall 412 and the outer sidewall 412 may be surrounded by the peripheral sidewall 411. When the user wears the loudspeaker apparatus, one side of the peripheral sidewall 411 may be in contact with a head of a human (e.g., a user), and the outer sidewall 412 may be located on the other side of the peripheral sidewall 411 away from the head of the human. In some embodiments, the housing 41 may be disposed with a cavity to accommodate the earphone core.

In some embodiments, the peripheral sidewall 411 may include a first peripheral sidewall 411*a* disposed along a length direction of the outer sidewall 412 and a second peripheral sidewall 411*b* disposed along a width direction of the outer sidewall 412. The outer sidewall 412 and the peripheral sidewall 411 may be connected together to form a cavity that is open at one end and accommodates the earphone core.

In some embodiments, the first peripheral sidewall 411*a* and the second peripheral sidewall 411*b* may each be two, and the two first peripheral sidewalls 411*a* and the two second peripheral sidewalls 411_b_ may be successively enclosed. When the user wears the loudspeaker apparatus, the two first peripheral sidewalls 411_a_ may respectively face the front and back sides of the head of the user (or human), and the two second peripheral sidewalls 411_b_ may respectively face the upper and lower sides of the head of the user.

In some embodiments, the outer sidewall 412 may be configured to cover an end enclosed by the first peripheral sidewall(s) 411_a_ and the second peripheral sidewall(s) 411_b_, so as to form the housing 41 that has a cavity with an open end and a closed end. The earphone core may be accommodated in the cavity of the housing 41.

In some embodiments, the shape enclosed by the first peripheral sidewall(s) 411_a_ and the second peripheral sidewall(s) 411_b_ may not be limited. The first peripheral sidewall(s) 411_a_ and the second peripheral sidewall(s) 411_b_ may form any shape suitable for the head of the user, such as a rectangular, a square, a circle, an oval, etc.

In some embodiments, the shape formed by the first peripheral sidewall(s) 411_a_ and the second peripheral sidewall(s) 411_b_ may conform to ergonomic principles and improve the wearing experience of the user. In some embodiments, the heights of the first peripheral sidewall(s) 411_a_ and the second peripheral sidewall(s) 411_b_ may be the same or different. When the heights of the two peripheral sidewalls 411 that are successively connected are different, it should be ensured that the protruding part of the peripheral sidewall(s) 411 may not affect the user's wearing and operation.

Figure 4:
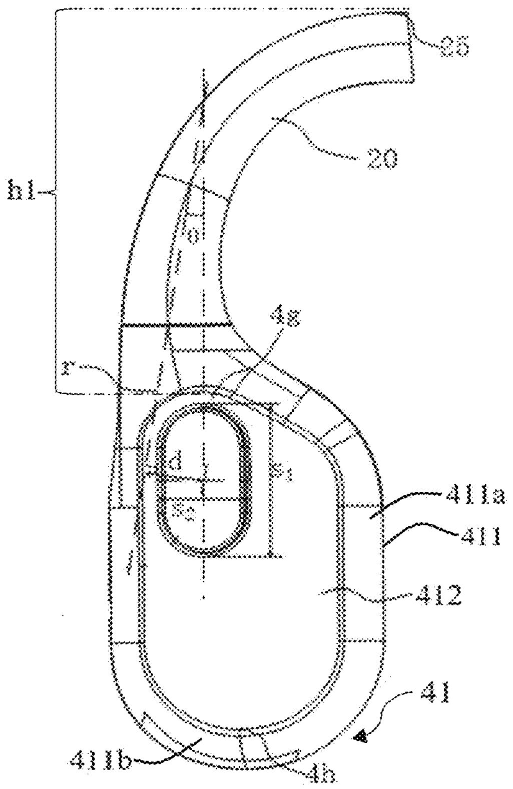
FIG. 4 is a schematic diagram illustrating an exemplary distance h1 of a loudspeaker apparatus according to some embodiments of the present disclosure.
Figure 5:
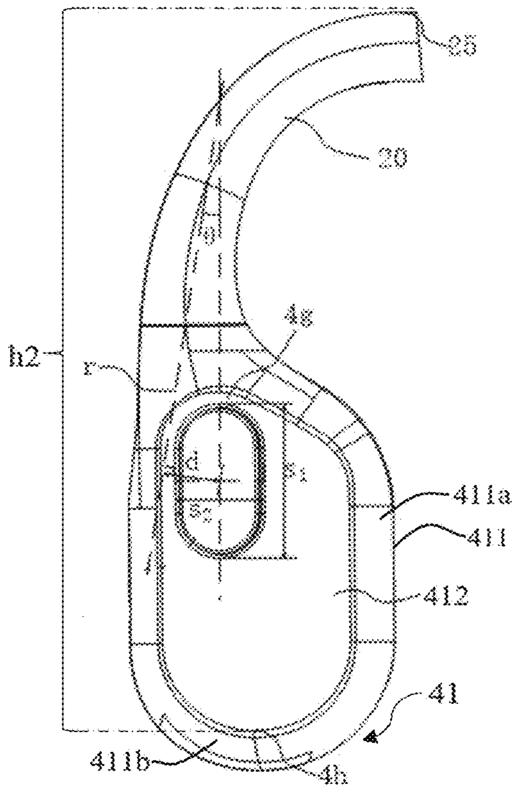
FIG. 5 is a schematic diagram illustrating an exemplary distance h2 of a loudspeaker apparatus according to some embodiments of the present disclosure.
Figure 6:
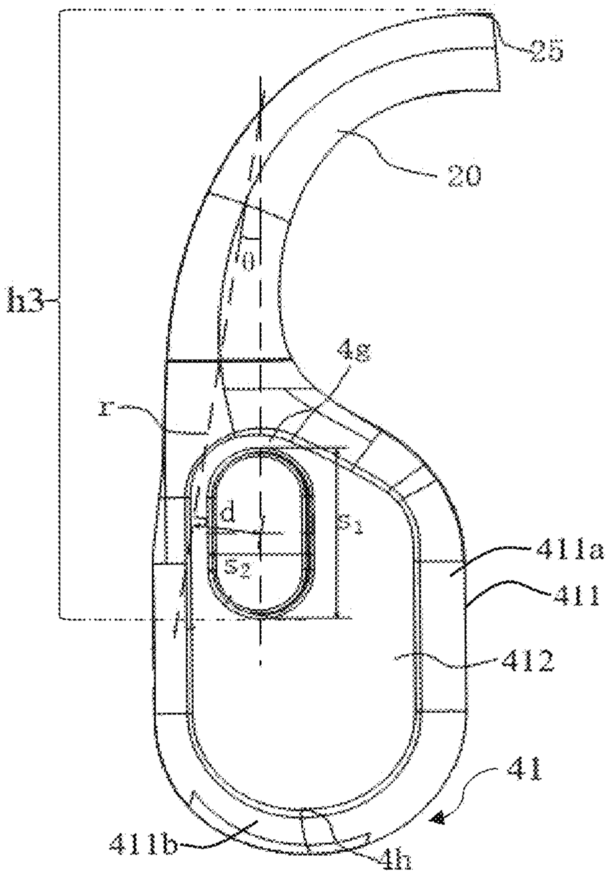
FIG. 6 is a schematic diagram illustrating an exemplary distance h3 of a loudspeaker apparatus according to some embodiments of the present disclosure.

FIG. 4 is a schematic diagram illustrating an exemplary distance h1 of the loudspeaker apparatus according to some embodiments of the present disclosure. FIG. 5 is a schematic diagram illustrating an exemplary distance h2 of the loudspeaker apparatus according to some embodiments of the present disclosure. FIG. 6 is a schematic diagram illustrating an exemplary distance h3 of the loudspeaker apparatus according to some embodiments of the present disclosure. In some embodiments, the outer sidewall 412 may be covered at one end enclosed by the first peripheral sidewall(s) 411_a_ and the second peripheral sidewall(s) 411_b_. When the user wears the loudspeaker apparatus, the outer sidewall 412 is located at the end of the first peripheral sidewall(s) 411_a_ and the second peripheral sidewall(s) 411_b_ away from the head of the user. In some embodiments, the outer sidewall 412 may include a proximal point and a distal point. The proximal point and the distal point may be located on an outline where the outer sidewall 412 is connected to the first peripheral sidewall(s) 411_a_ and the second peripheral sidewall(s) 411_b_, respectively. The proximal point and the distal point may be located at relative positions of the outline, respectively. In some embodiments, a distance h1 between the proximal point and the vibration fulcrum may be the shortest, and the proximal point may be a top position. A distance h2 between the distal point and the vibration fulcrum may be the longest, and the distal point may be a bottom position. In some embodiments, a distance h3 between a midpoint of a line connecting the proximal point and the distal point and the vibration fulcrum may be between the distance h1 and the distance h2, and the midpoint of the line connecting the proximal point and the distal point may be a middle position.

In some embodiments, the key module 4_d_ may be located in the middle position of the outer sidewall 412. Alternatively, the key module 4_d_ may be located between the middle position and the top position of the outer sidewall 412.

Figure 7:
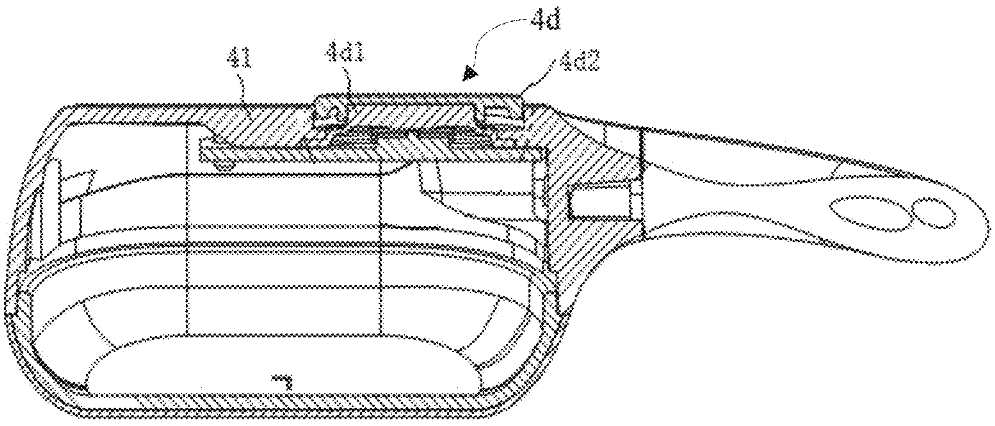
FIG. 7 is a sectional view of a local structure of an exemplary loudspeaker component according to some embodiments of the present disclosure.

FIG. 7 is a sectional view of a local structure of an exemplary loudspeaker component according to some embodiments of the present disclosure. As shown in FIG. 7, the key module 4_d_ may further include an elastic seat 4_d_1 and a key 4_d_2.

In some embodiments, the shape of the key 4_d_2 may be a rounded rectangle, and the rounded rectangular key 4_d_2 may extend along the length direction of the outer sidewall 412. The key 4_d_2 may include two axes of symmetry (long axis and short axis), which are arranged axisymmetrically in two directions of symmetry that are perpendicular to each other.

Figure 8:
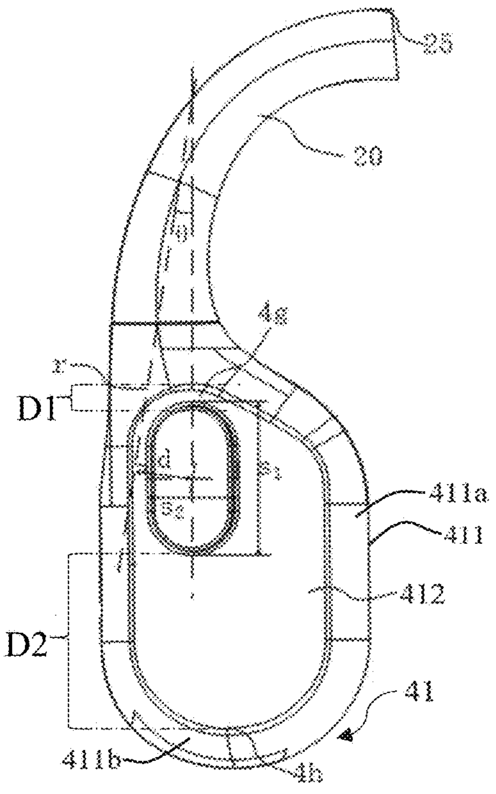
FIG. 8 is a schematic diagram illustrating distances D1 and D2 of a loudspeaker apparatus according to some embodiments of the present disclosure.

FIG. 8 is a schematic diagram illustrating distances D1 and D2 of the loudspeaker apparatus according to some embodiments of the present disclosure. As shown in FIG. 8, the distance between the top of the key 4_d_2 and the top position of the outer sidewall 412 may be a first distance D1. The distance between the bottom of the key 4_d_2 and the bottom position of the outer sidewall 412 may be a second distance D2. The ratio of the first distance D1 to the second distance D2 may not be greater than 1.

Specifically, when the ratio between the first distance D1 and the second distance D2 is equal to 1, the key 4_d_2 may be located at the middle position of the outer sidewall 412. When the ratio between the first distance D1 and the second distance D2 is less than 1, the key 4_d_2 may be located between the middle position and the top position of the outer sidewall 412.

Further, the ratio between the first distance D1 and the second distance D2 may not be greater than 0.95, so that the key 4_d_2 may be relatively close to the top position of the outer sidewall 412, that is, relatively close to the vibration fulcrum, thereby increasing the volume of the loudspeaker component 40. The ratio between the first distance D1 and the second distance D2 may also be 0.9, 0.8, 0.7, 0.6, 0.5, etc., which may be determined according to different requirements.

In some embodiments, a connection part between the ear hook 20 and the loudspeaker module may have a central axis. In some embodiments, an outer side surface may be included. In some embodiments, the outer side surface of the key 4_d_2 may be a side surface away from the head of the user when the user wears the loudspeaker apparatus. In some embodiments, an extension line r of the central axis may have a projection on a plane on which the outer side surface of the key is located. An included angle θ between the projection and the long axis direction of the key 4_d_2 may be less than 10°. For example, the included angle θ may be 9°, 7°, 5°, 3°, 1°, etc.

When the included angle θ between the projection of the extension line r on the plane where the outer side surface of the key 4_d_2 is located and the long axis direction is less than 10°, the long axis direction of the key 4_d_2 may not deviate too much from the extension direction of the extension line r, so that the direction of the key 4_d_2 in the long axis direction is consistent with or close to the extension line r of the central axis.

In some embodiments, the extension line r of the central axis may have a projection on the plane on which the outer side surface of the key 4_d_2 is located. The long axis direction and the short axis direction of the outer side surface of the key 4_d_2 may have an intersection, and the projection and the intersection may have the shortest distance d. The shortest distance d may be less than a size $s_2$ of the outer side surface of the key 4_d_2 in the short axis direction, so that the key 4_d_2 is close to the extension line r of the central axis of the ear hook. In some embodiments, the projection of the extension line r of the central axis of the ear hook 20 on the plane where the outer side surface of the key 4*d*2 is located may coincide with the long axis direction to further improve the sound quality of the loudspeaker component 40.

In some embodiments, the long axis direction of the key 4*d*2 may be a direction from the top of the key 4*d*2 to the bottom of the key 4*d*2, or may be a direction along which the ear hook 20 and the housing 41 are connected. The short axis direction of the key 4*d*2 may be a direction that is perpendicular to the long axis of the key 4*d*2 and passes through the midpoint of the line connecting the top and the bottom of the key 4*d*2. The size of the key 4*d*2 in the long axis direction may be s1, and the size of the key 4*d*2 in the short axis direction may be $s_2$.

In some embodiments, the first peripheral sidewall 411*a* may have a bottom position, a middle position, and a top position in a direction close to the vibration fulcrum.

The bottom position may be a connection point between the first peripheral sidewall 411*a* and the second peripheral sidewall 411*b* away from the ear hook 20. The top position may be a connection point between the first peripheral sidewall 411*a* and the second peripheral sidewall 411*b* near the ear hook 20. The middle position may be the midpoint of a line connecting the bottom position and the top position of the first peripheral sidewall 411*a*.

In some embodiments, the key module 4*d* may be located in the middle position of the first peripheral sidewall 411*a* (not shown in FIG. 8). Alternatively, the key module 4*d* may be located between the middle position and the top position of the first peripheral sidewall 411*b* (not shown in FIG. 8). The key module 4*d* may be centered on the first peripheral sidewall 411*a* along the width direction of the first peripheral sidewall 411*a*.

Figure 9:
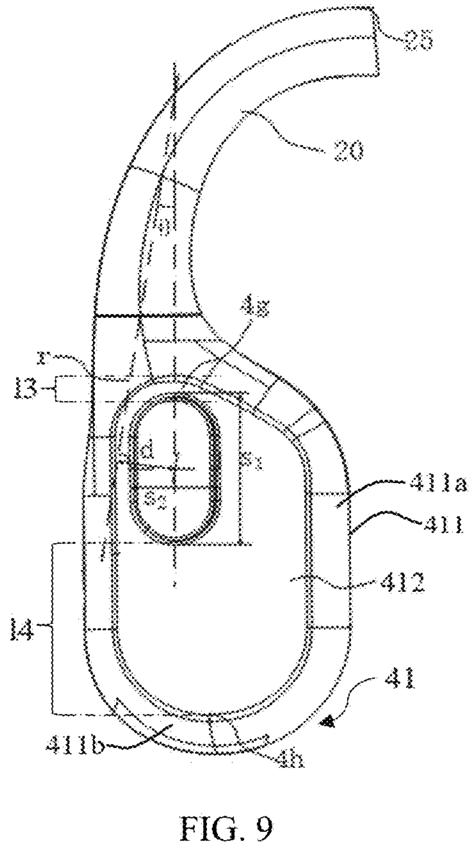
FIG. 9 is a schematic diagram illustrating distances I3 and I4 of a loudspeaker apparatus according to some embodiments of the present disclosure.

FIG. 9 is a schematic diagram illustrating distances I3 and I4 of the loudspeaker apparatus according to some embodiments of the present disclosure. In some embodiments, the distance between the top of the key module 4*d* and the top position of the first peripheral sidewall 411*a* may be a third distance I3. The distance between the bottom of the key module 4*d* and the bottom position of the first peripheral sidewall 411*a* may be a fourth distance I4. The ratio of the third distance I3 to the fourth distance I4 may not be greater than 1.

Further, the ratio between the third distance I3 and the fourth distance I4 may not be greater than 0.95, so that the key module 4*d* may be relatively close to the top position of the first peripheral sidewall 411*a*, that is, relatively close to the vibration fulcrum, thereby increasing the volume of the loudspeaker component 40. The ratio between the third distance I3 and the fourth distance I4 may be 0.9, 0.8, 0.7, 0.6, 0.5, etc., which may be determined according to actual requirements.

As described above, a third distance D3 may refer to the distance between the top of the key 4*d*2 and the top position of the first peripheral sidewall 411*a*, and a fourth distance D4 may refer to the distance between the bottom of the key 4*d*2 and the bottom position of the first peripheral sidewall 411*a*. The ratio of the third distance D3 to the fourth distance D4 may not be greater than 1.

Further, the ratio between the third distance D3 and the fourth distance D4 may not be greater than 0.95, so that the key 4*d*2 is relatively close to the top position of the first peripheral sidewall 411*a*, that is, relatively close to the vibration fulcrum, thereby increasing the volume of the loudspeaker component 40. The ratio between the third distance D3 and the fourth distance D4 may also include 0.9, 0.8, 0.7, 0.6, 0.5, etc., which may be determined according to actual requirements.

It should be noted that the above description of the loudspeaker apparatus is only a specific example, and should not be regarded as the only feasible implementation solution. Obviously, for persons having ordinary skills in the art, after understanding the basic principle of the loudspeaker apparatus, various modifications and changes may be made in the form and details of the specific ways and steps of implementing the loudspeaker apparatus without departing from the principle, but these modifications and changes are still within the scope of the present disclosure. For example, the key module 4*d* may only be disposed in one of the loudspeaker components 40 on the left and right. As another example, the two loudspeaker components 40 may both be disposed with the key module 4*d*. All such variations are within the protection scope of the present disclosure.

Figure 10:
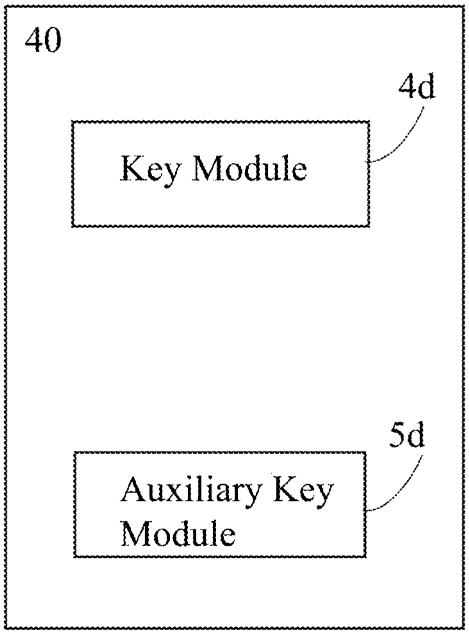
FIG. 10 is a block diagram illustrating an exemplary loudspeaker apparatus according to some embodiments of the present disclosure.

FIG. 10 is a block diagram illustrating an exemplary loudspeaker apparatus according to some embodiments of the present disclosure.

In some embodiments, the loudspeaker apparatus may further include an auxiliary key module 5*d*. The auxiliary key module 5*d* may be configured to provide more functions for human-computer interaction.

In some embodiments, the auxiliary key module 5*d* may include a power key, a function shortcut key, and a menu shortcut key. In some embodiments, the function shortcut key may include a volume plus key and a volume minus key for adjusting a sound level, a fast forward key, and a fast backward key for adjusting the progress of a sound file, etc. In some embodiments, the auxiliary key module 5*d* may include a physical key form, a virtual key form, etc. In some embodiments, a surface of each key in the auxiliary key module 5*d* may be disposed with a logo corresponding to its function. In some embodiments, the logo may include text (e.g., in Chinese, English), symbols (e.g., the volume plus key is marked with "+", the volume minus key is marked with "−"), etc. In some embodiments, the logo may be disposed on the key(s) through laser printing, screen printing, pad printing, laser filler, thermal sublimation, hollow-out text, or the like. In some embodiments, the logo on the key(s) may also be disposed on the surface of the housing 41 that is located on the periphery of the keys for labeling. In some embodiments, the loudspeaker apparatus may include a touch screen. A control program installed in the loudspeaker apparatus may generate a virtual key on the touch screen having an interactive function. The user may select a function, a volume, and a file via the virtual key. In some embodiments, the loudspeaker apparatus may include a combination of a physical display screen and physical keys.

It should be noted that the above description of the loudspeaker component is only a specific example, and should not be considered as the only feasible implementation solution. Obviously, for persons having ordinary skills in the art, after understanding the basic principle of the loudspeaker component, various modifications and changes may be made in the form and details of the specific ways and steps of implementing the loudspeaker component without departing from the principle, but these modifications and changes are still within the scope of the present disclosure. For example, the auxiliary key module 5*d* in the loudspeaker apparatus may have a regular shape such as a rectangle, a circle, an ellipse and a triangle, or may have an irregular shape. All such variations are within the protection scope of the present disclosure.

Figure 11:
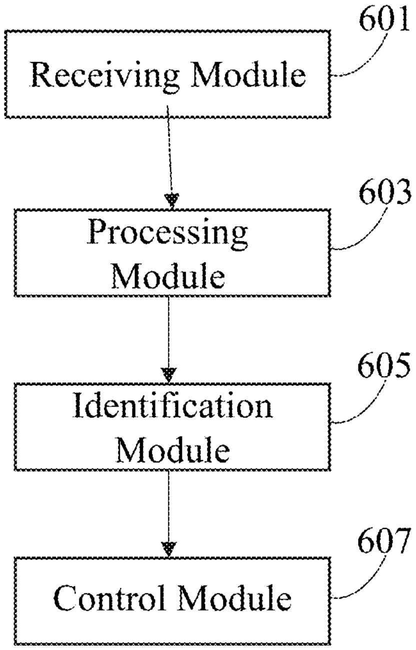
FIG. 11 is a block diagram illustrating a voice control system according to some embodiments of the present disclosure.

FIG. 11 is a block diagram illustrating a voice control system according to some embodiments of the present disclosure. The voice control system may be a portion of the auxiliary key module or may be served as a separate model integrated into the loudspeaker apparatus. In some embodiments, the voice control system may include a receiving module 601, a processing module 603, an identification module 605, and a control module 607.

In some embodiments, the receiving module 601 may be configured to receive a voice control instruction and send the voice control instruction to the processing module 603. In some embodiments, the receiving module 601 may include one or more microphones. In some embodiments, when the receiving module 601 receives the voice control instruction inputted by a user, (e.g., the receiving module 601 receives a voice control instruction of "start playing"), the receiving module 601 may then send the voice control instruction to the processing module 603.

In some embodiments, the processing module 603 may be in communication with the receiving module 601. The processing module 603 may generate an instruction signal according to the voice control instruction, and send the instruction signal to the identification module 605.

In some embodiments, when the processing module 603 receives the voice control instruction inputted by the user from the receiving module 601 through the communication connection, the processing module 603 may generate an instruction signal according to the voice control instruction.

In some embodiments, the identification module 605 may be in communication with the processing module 603 and the control module 607. The identification module 605 may identify whether the instruction signal matches a predetermined signal, and send a matching result to the control module 607.

In some embodiments, when the identification module 605 determines that the instruction signal matches the predetermined signal, the identification module 605 may send the matching result to the control module 607. The control module 607 may control the operations of the loudspeaker apparatus according to the instruction signal. For example, when the receiving module 601 receives a voice control instruction of "start playing", and when the identification module 605 determines that the instruction signal corresponding to the voice control instruction matches the predetermined signal, the control module 607 may automatically perform the voice control instruction. The control module 607 may immediately automatically perform starting playing audio data. When the instruction signal does not match the predetermined signal, the control module 607 may not perform the control instruction.

In some embodiments, the voice control system may further include a storage module, which is in communication with the receiving module 601, the processing module 603, and the identification module 605. The receiving module 601 may receive and send a predetermined voice control instruction to the processing module 603. The processing module 603 may generate a predetermined signal according to the predetermined voice control instruction, and send the predetermined signal to the storage module. When the identification module 605 needs to match the instruction signal received from the processing module 603 by the receiving module 601 with the predetermined signal, the storage module may send the predetermined signal to the identification module 605 through the communication connection.

In some embodiments, the processing module 603 may further include removing environmental sound contained in the voice control instruction.

In some embodiments, the processing module 603 in the voice control system may further include performing denoising processing on the voice control instruction. The denoising processing may refer to removing the environmental sound contained in the voice control instruction. In some embodiments, when in a complex environment, the receiving module 601 may receive and send the voice control instruction to the processing module 603. Before the processing module 603 generates the corresponding instruction signal according to the voice control instruction, in order to prevent the environmental sound from interfering with the recognition process of the identification module 605, the voice control instruction may first be denoised. For example, when the receiving module 601 receives a voice control instruction inputted by the user when the user is in an outdoor environment, the voice control instruction may include environmental sound such as vehicle driving on the road, whistle. The processing module 602 may perform the denoising processing to reduce the influence of the environmental sound on the voice control instruction.

It should be noted that the above description of the voice control system is only a specific example and should not be considered as the only feasible implementation solution. Obviously, for persons having ordinary skills in the art, after understanding the basic principle of the voice control system, various modifications and changes may be made in the form and details of the specific ways and steps of implementing the voice control system without departing from the principle, but these modifications and changes are still within the scope of the present disclosure. For example, the receiving module 601 and the processing module 603 may be combined into one single module. All such variations are within the protection scope of the present disclosure.

In some embodiments, the loudspeaker apparatus may also include an indicator lamp module (not shown in FIG. 11) to display working status of the loudspeaker apparatus. Specifically, the indicator lamp module (also referred to as indicator lamp) may emit a light signal, and the working status of the loudspeaker apparatus may be known based on the light signal (e.g., by observing the light signal).

In some embodiments, the indicator lamp may show the power of the loudspeaker apparatus. For example, when the indicating lamp is red, it means that the power of the loudspeaker apparatus is insufficient (e.g., the power is less than 5%, 10%, etc.). As another example, when the loudspeaker apparatus is charging, the indicator lamp may blink. As a further example, when the indicating lamp is green, it means that the loudspeaker apparatus may have sufficient power (e.g., the power is above 50%, 80%, etc.). In some embodiments, the color of the indicator lamp may be adjusted as needed, which is not limited here.

Of course, it can be understood that the indicator lamp may indicate the power of the loudspeaker apparatus in other ways. In some embodiments, there may be multiple indicator lamps, and the current power of the loudspeaker apparatus may be represented by the count of indicator lamps that are luminous. Specifically, in an application scenario, there may be three indicator lamps. When only one indicator lamp is luminous, it may indicate that the power of the loudspeaker apparatus is insufficient, and the power may be turned off at any time (e.g., the power is between 1% to 20%). When only two indicator lamps are luminous, it may indicate that the power of the loudspeaker apparatus may be in a normal use state and can be charged (e.g., the power is between 21% to 70%). When the three indicator lamps are luminous, it may indicate that the power of the loudspeaker apparatus may be in a full state, no charging is required, and the standby time is long (e.g., the power is at 71%~100%).

In some embodiments, the indicator lamp may indicate the current communication status of the loudspeaker apparatus. For example, when the loudspeaker apparatus is in communication with other devices (such as via Wi-Fi connection, Bluetooth connection, etc.), the indicator lamp may remain blinking or may be displayed as other colors (such as blue).

It should be noted that the above description of the loudspeaker apparatus is only a specific example, and should not be regarded as the only feasible implementation solution. Obviously, for persons having ordinary skills in the art, after understanding the basic principle of the loudspeaker apparatus, various modifications and changes may be made in form and detail of the specific ways and steps of implementing the loudspeaker apparatus without departing from the principle, but these modifications and changes are still within the scope of the present disclosure. For example, when the loudspeaker apparatus is charging, the indicator lamp may be displayed as another color (such as purple). All such variations are within the protection scope of the present disclosure.

Under normal circumstances, the sound quality of the loudspeaker apparatus is affected by various factors, such as the physical properties of the components of the loudspeaker apparatus, the vibration transmission relationship between the various components, the vibration transmission relationship between the loudspeaker apparatus and the outside components, the efficiency of the vibration transmission system when transmitting vibration, or the like, or any combination thereof. The components of the loudspeaker apparatus may include a component (e.g., the earphone core) that generates vibration, a component (e.g., the ear hook 20) that fixes the loudspeaker apparatus, and a component (e.g., the panel on the housing 41, the vibration transmission layer, etc.) that transmits vibration. The vibration transmission relationship between the various components and/or the vibration transmission relationship between the loudspeaker apparatus and the outside components may be determined by a contact mode between the loudspeaker and the user (e.g., a clamping force, a contact area, a contact shape, etc.).

Figure 12:
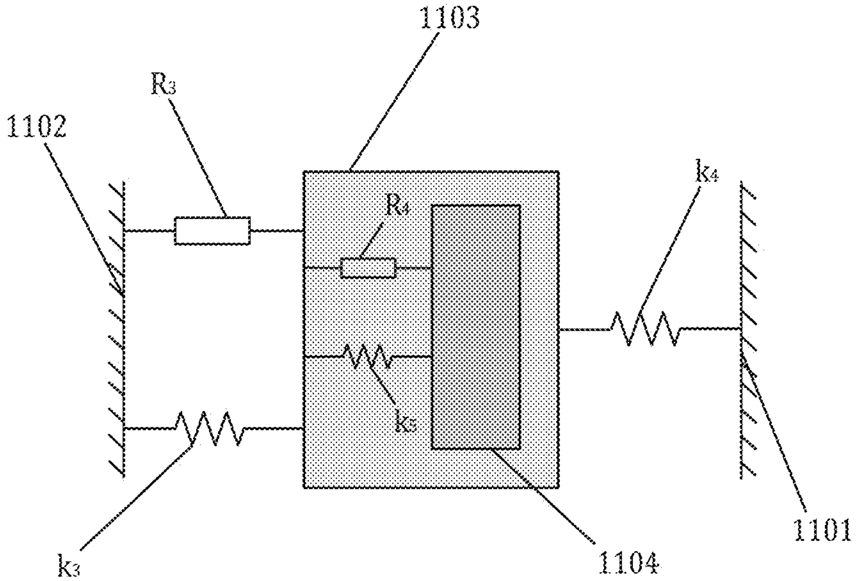
FIG. 12 is a schematic diagram illustrating an equivalent model of a vibration generation and transmission system of a loudspeaker apparatus according to some embodiments of the present disclosure.

For the purpose of illustration only, the relationship between the sound quality and the components of the loudspeaker apparatus will be further described below based on the loudspeaker apparatus. It should be noted that the content described below may also be applied to bone conduction and air conduction loudspeaker apparatuses without violating the principle. FIG. 12 is a schematic diagram illustrating an equivalent model of a vibration generation and transmission system of a loudspeaker apparatus according to some embodiments of the present disclosure. As shown in FIG. 12, the vibration generation and transmission system may include a fixed end 1101, a sensing terminal 1102, a vibration unit 1103, and an earphone core 1104. In some embodiments, the fixed end 1101 may be connected to the vibration unit 1103 through a transmission relationship K1 ($k_4$ illustrated in FIG. 12). The sensing terminal 1102 may be connected to the vibration unit 1103 through a transmission relationship K2 ($R_3$, $k_3$ illustrated in FIG. 12). The vibration unit 1103 may be connected to the earphone core 1104 through a transmission relationship K3 ($R_4$, $k_5$ illustrated in FIG. 12).

The vibration unit herein may refer to the housing 41. The transmission relationships K1, K2 and K3 may be the descriptions of vibration transmission relationships between corresponding components (or parts) of the equivalent system of the loudspeaker apparatus (will be described in detail below). The vibration equation of the equivalent system may be expressed as:

$$m_3x_3''+R_3x_3'-R_4x_4'+(k_3+k_4)x_3+k_5(x_3-x_4)=f_3, \tag{1}$$

$$m_4x_4''+R_4x_4''-k_5(x_3-x_4)=f_4, \tag{2}$$

wherein $m_3$ is the equivalent mass of the vibration unit 1103; $m_4$ is the equivalent mass of the earphone core 1104; $x_3$ is the equivalent displacement of the vibration unit 1103; $x_4$ is the equivalent displacement of the earphone core 1104; $k_3$ is the equivalent elastic coefficient between the sensing terminal 1102 and the vibration unit 1103; $k_4$ is the equivalent elastic coefficient between the fixed end 1101 and the vibration unit 1103; $k_5$ is the equivalent elastic coefficient between the earphone core 1104 and the vibration unit 1103; $R_3$ is the equivalent damping between the sensing terminal 1102 and the vibration unit 1103; $R_4$ is the equivalent damping between the earphone core 1104 and the vibration unit 1103; and $f_3$ and $f_4$ are the interaction forces between the vibration unit 1103 and the earphone core 1104, respectively. The equivalent amplitude $A_3$ of the vibration unit 1103 in the system is denoted as:

$$A_3 = -\frac{m_4\omega^2}{\left(m_3\omega^2 + j\omega R_3 - (k_3+k_4+k_5)\right)\left(m_4\omega^2 + j\omega R_4 - k_5\right) - k_5(k_5 - j\omega R_4)} \cdot f_0, \tag{3}$$

wherein $f_0$ refers to unit driving force; and ω refers to the vibration frequency. In some embodiments, the factors that affect the frequency response of the loudspeaker apparatus may include the vibration generation components (e.g., the vibration unit 1103, the earphone core 1104, the housing, and the interconnection ways thereof, for example, $m_3$, $m_4$, $k_5$, $R_4$, in the Equation (3), etc.), and vibration transmission components (e.g., the way of contacting the skin, the property of the ear hook, such as $k_3$, $k_4$, $R_3$, in the Equation (3), etc.). The frequency response and the sound quality of the loudspeaker apparatus may be changed by changing the structure of the various components of the loudspeaker apparatus and the parameters of the connections between the various components. For example, changing the magnitude of the clamping force is equivalent to changing the size of $k_4$; changing the bonding way of glue is equivalent to changing the size of $R_4$ and $k_5$; and changing the hardness, elasticity, and damping of the materials is equivalent to changing the size of $k_3$ and $R_3$.

In some embodiments, the fixed end 1101 may be a relatively fixed point or a relatively fixed area of the loudspeaker apparatus during vibration (e.g., the top of the ear hook 25). These points or areas may be regarded as fixed ends of the loudspeaker apparatus during the vibration. The fixed ends may be composed of specific components or may be positions determined according to the overall structure of the loudspeaker apparatus. For example, the loudspeaker apparatus can be hung, bonded, or adsorbed near the human ears through a specific apparatus. The structure and shape of the loudspeaker apparatus may be designed so that the loudspeaker apparatus can be attached to the human skin.

The sensing terminal 1102 may be an auditory system of the human for receiving sound signals. The vibration unit 1103 may be a part of the loudspeaker apparatus for protecting, supporting, and connecting the earphone core 1104, and may include parts that directly or indirectly contact the user, such as a vibration transmission layer or a panel (a side of the housing close to the human) that transmits vibration to the user, and a housing that protects and supports other vibration generation components.

The transmission relationship K1 may connect the fixed end 1101 and the vibration unit 1103, which indicates the vibration transmission relationship between the vibration generation components of the loudspeaker apparatus and the fixed end 1101. K1 may be determined based on the shape and structure of the loudspeaker apparatus. For example, the loudspeaker apparatus may be fixed to the head of the human in the form of a U-shaped earphone rack/earphone strap. The loudspeaker apparatus may also be installed on devices such as a helmet, a fire mask, or other special-purpose masks, glasses, etc. The shape and structure of different loudspeaker apparatuses will affect the vibration transmission relationship K1. Further, the structure of the loudspeaker apparatus may also include physical properties such as the material and quality of different components of the loudspeaker apparatus. The transmission relationship K2 may connect the sensing terminal 402 and the vibration unit 1103.

K2 may be determined based on the composition of the transmission system. The transmission system may include transmitting sound vibration to the auditory system through the user's tissue (also referred to as human tissue). For example, when the sound is transmitted to the auditory system through the skin, the subcutaneous tissue, bones, etc., the physical properties of different human tissues and their interconnections may affect K2. Further, the vibration unit 1103 may be in contact with the human tissue. In different embodiments, the contact area on the vibration unit may be a side of the vibration transmission layer or the panel. The surface shape, size of the contact area, and the interaction force of the contact area with the human tissue may affect the transmission relationship K2.

The transmission relationship K3 between the vibration unit 1103 and the earphone core 1104 may be determined by internal connection properties of the vibration generation components of the loudspeaker apparatus. The earphone core 1104 and the vibration unit 1103 may be connected rigidly or elastically. The relative position of the connector between the earphone core 1104 and the vibration unit 1103 may change the transmission efficiency of the earphone core 1104 to transmit vibration to the vibration unit 1103, such as the transmission efficiency of the panel, which affects the transmission relationship K3.

During the use of the loudspeaker apparatus, the generation and transmission process of the sound will affect the sound quality felt by the human (or the user). For example, the fixed end 1101, the sensing terminal 1102, the vibration unit 1103, the earphone core 1104, and/or transmission relationships K1, K2, and K3, etc., may affect the sound quality of the loudspeaker apparatus. It should be noted that K1, K2, and K3 are only a representation of the connection ways of different components or systems during the vibration transmission process, which may include physical connection ways, force transmission ways, sound transmission efficiency, etc.

The above description of the equivalent system of loudspeaker apparatus is only a specific example and should not be regarded as the only feasible implementation solution. Obviously, for persons having ordinary skills in the art, after understanding the basic principle of the loudspeaker apparatus, various modifications and changes may be made in the form and details of the specific ways and steps that affect the vibration transmission of the loudspeaker apparatus without departing from the principle, but these modifications and changes are still within the scope of the present disclosure. For example, K1, K2, and K3 described above may be a simple vibration or mechanical transmission way, or may include a complex non-linear transmission system. The transmission relationship may include transmission through direct connection of various components (or parts), or may include transmission through a non-contact way.

Figure 13:
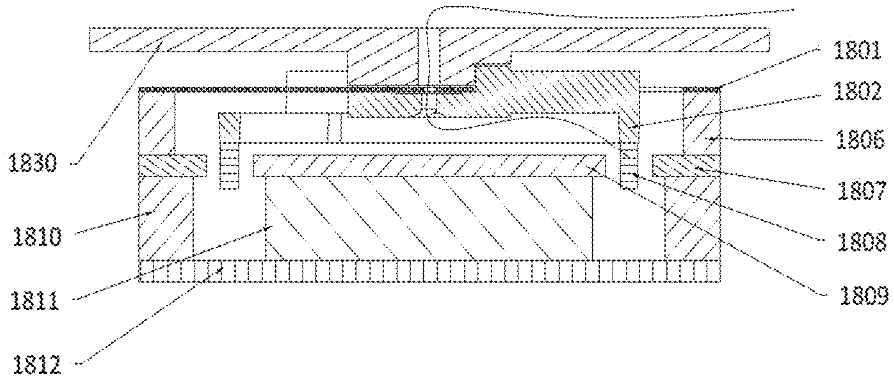
FIG. 13 is a structural schematic diagram illustrating a composite vibration component of a loudspeaker apparatus according to some embodiments of the present disclosure.
Figure 14:
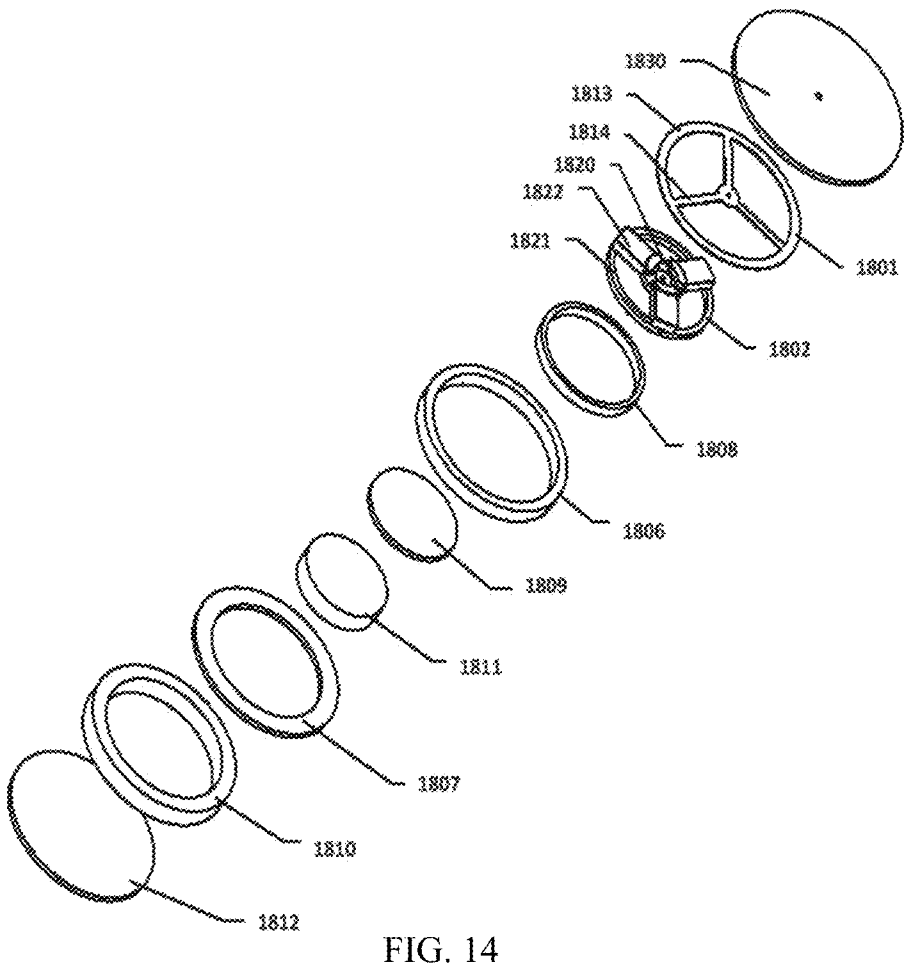
FIG. 14 is a structural schematic diagram illustrating a composite vibration component of a loudspeaker apparatus according to some embodiments of the present disclosure.

FIG. 13 is a structural schematic diagram illustrating a composite vibration component of a loudspeaker apparatus according to some embodiments of the present disclosure. FIG. 14 is a structural schematic diagram illustrating a composite vibration component of a loudspeaker apparatus according to some embodiments of the present disclosure.

In some embodiments, the loudspeaker apparatus may include a composite vibration component. In some embodiments, the composite vibration component may be part of the earphone core. Examples of the composite vibration component of the loudspeaker apparatus are shown in FIGS. 13 and 14. The composite vibration component may be composed of a vibration conductive plate 1801 and a vibration board 1802. The vibration conductive plate 1801 may be disposed as a first annular body 1813. Three first support rods 1814 that are converged toward a center may be disposed in the first annular body 1813. The position of the converged center may be fixed to a center of the vibration board 1802. The center of the vibration board 1802 may be a groove 1820 that matches the converged center and the first support rods. The vibration board 1802 may be disposed with a second annular body 1821 having a radius different from that of the vibration conductive plate 1801, and three second support rods 1822 having different thicknesses from the first support rods 1814. The first support rods 1814 and the second support rods 1822 may be staggered, and may have a 60° angle.

Figure 15:
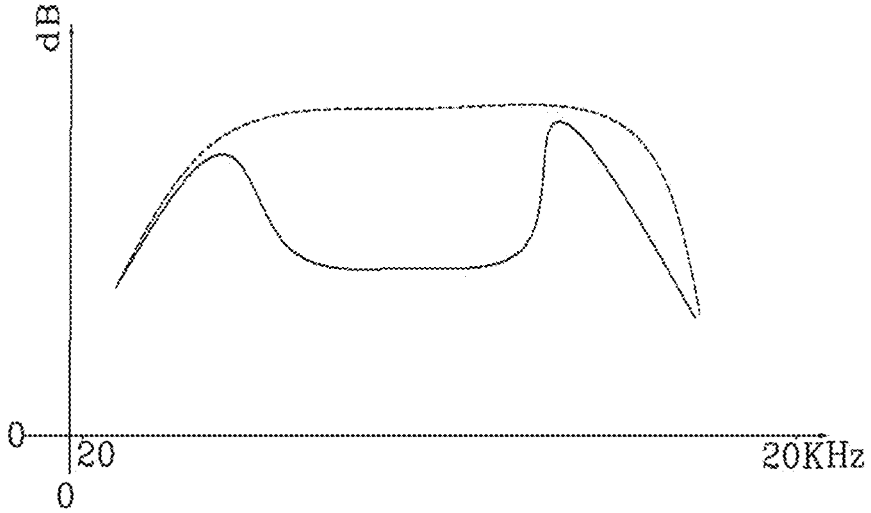
FIG. 15 is a schematic diagram illustrating a frequency response curve of a loudspeaker apparatus according to some embodiments of the present disclosure.

The first and second support rods may both be straight rods or other shapes that meet specific requirements. The count of the support rods may be more than two, and symmetrical or asymmetrical arrangement may be applied to meet the requirements of economic and practical effects. The vibration conductive plate 1801 may have a thin thickness and can increase elastic force. The vibration conductive plate 1801 may be stuck in the center of the groove 1820 of the vibration board 1802. A voice coil 1808 may be attached to the lower side of the second annular body 1821 of the vibration board 1802. The composite vibration component may also include a bottom plate 1812 on which an annular magnet 1810 is disposed. An inner magnet 1811 may concentrically be disposed in the annular magnet 1810. An inner magnetic plate 1809 may be disposed on the top of the inner magnet 1811, and an annular magnetic plate 1807 may be disposed on the annular magnet 1810. A washer 1806 may be fixedly disposed above the annular magnetic plate 1807. The first annular body 1813 of the vibration conductive plate 1801 may be fixedly connected to the washer 1806. The composite vibration component may be connected to outside component(s) through a panel 1830. The panel 1830 may be fixedly connected to the position of the converged center of the vibration conductive plate 1801, and may be fixed to the center of the vibration conductive plate 1801 and the vibration board 1802. Using the composite vibration component composed of the vibration board and the vibration conductive plate, the frequency response as shown in FIG. 15 can be obtained, and two resonance peaks may be generated. By adjusting parameters such as the size and material of the two components (e.g., the vibration conductive plate and the vibration board) may make the resonance peaks appear in different positions. For example, a low-frequency resonance peak appears at a position at a lower frequency, and/or a high-frequency resonance peak appears at a position at a higher frequency. In some embodiments, the stiffness coefficient of the vibration board may be greater than the stiffness coefficient of the vibration conductive plate. The vibration board may generate the high-frequency resonance peak of the two resonance peaks, and the vibration conductive plate may generate the low-frequency resonance peak of the two resonance peaks. The resonance peaks may be or may not be within the frequency range of sound perceivable by human ears. In some embodiments, neither of the resonance peaks may be within the frequency range of sound perceivable by the human ears. In some embodiments, one resonance peak may be within the frequency range of sound perceivable by the human ears, and another resonance peak may not be within the frequency range of sound perceivable by the human ears. In some embodiments, both the resonance peaks may be within the frequency range of sound perceivable by the human ears. In some embodiments, both the resonance peaks may be within the frequency range of sound perceivable by the human ears, and their frequencies may be between 80 Hz-18000 Hz. In some embodiments, both the resonance peaks may be within the frequency range of sound perceivable by the human ears, and their frequencies may be between 200 Hz-15000 Hz. In some embodiments, both the resonance peaks may be within the frequency range of sound perceivable by the human ears, and their frequencies may be between 500 Hz-12000 Hz. In some embodiments, both the resonance peaks may be within the frequency range of sound perceivable by the human ears, and their frequencies may be between 800 Hz-11000 Hz. The frequencies of the resonance peaks may have a certain gap. For example, the frequency difference between the two resonance peaks may be at least 500 Hz. In some embodiments, the frequency difference between the two resonance peaks may be at least 1000 Hz. More In some embodiments, the frequency difference between the two resonance peaks may be at least 2000 Hz. In some embodiments, the frequency difference between the two resonance peaks may be at least 5000 Hz. In order to achieve better results, the both resonance peaks may be within the frequency range of sound perceivable by the human ears, and the frequency difference between the two resonance peaks may be at least 500 Hz. In some embodiments, the both resonance peaks may be within the frequency range of sound perceivable by the human ears, and the frequency difference between the two resonance peaks may be at least 1000 Hz. In some embodiments, the both resonance peaks may be within the frequency range of sound perceivable by the human ears, and the frequency difference between the two resonance peaks may be at least 2000 Hz. In some embodiments, the two resonance peaks may both be within the frequency range of sound perceivable by the human ears, and the frequency difference between the two resonance peaks may be at least 3000 Hz. In some embodiments, the resonance peaks may both be within the frequency range of sound perceivable by the human ears, and the frequency difference between the two resonance peaks may be at least 4000 Hz. One of the two resonance peaks may be within the frequency range of sound perceivable by the human ears and the other may not be within the frequency range of sound perceivable by the human ears, and the frequency difference between the two resonance peaks may be at least 500 Hz. In some embodiments, one resonance peak may be within the frequency range of sound perceivable by the human ears and the other may not be within the frequency range of sound perceivable by the human ears, and the frequency difference between the two resonance peaks may be at least 1000 Hz. In some embodiments, one resonance peak may be within the frequency range of sound perceivable by the human ears and the other may not be within the frequency range of sound perceivable by the human ears, and the frequency difference between the two resonance peaks may be at least 2000 Hz. In some embodiments, one resonance peak may be within the frequency range of sound perceivable by the human ears and the other may not be within the frequency range of sound perceivable by the human ears, and the frequency difference between the two resonance peaks may be at least 3000 Hz. In some embodiments, one resonance peak may be within the frequency range of sound perceivable by the human ears and the other may not be within the frequency range of sound perceivable by the human ears, and the frequency difference between the two resonance peaks may be at least 4000 Hz. The two resonance peaks may both be between 5 Hz-30000 Hz, and the frequency difference between the two resonance peaks may be at least 400 Hz. In some embodiments, the two resonance peaks may both be between 5 Hz-30000 Hz, and the frequency difference between the two resonance peaks may be at least 1000 Hz. In some embodiments, the two resonance peaks may both be between 5 Hz-30000 Hz, and the frequency difference between the two resonance peaks may be at least 2000 Hz. In some embodiments, the two resonance peaks may both be between 5 Hz-30000 Hz and the frequency difference between the two resonance peaks may be at least 3000 Hz. In some embodiments, the two resonance peaks may both be between 5 Hz and 30000 Hz, and the frequency difference between the two resonance peaks may be at least 4000 Hz. The two resonance peaks may both be between 20 Hz-20000 Hz, and the frequency difference between the two resonance peaks may be at least 400 Hz. In some embodiments, the two resonance peaks may both be between 20 Hz-20000 Hz, and the frequency difference between the two resonance peaks may be at least 1000 Hz. In some embodiments, the two resonance peaks may both be between 20 Hz-20000 Hz, and the frequency difference between the two resonance peaks may be at least 2000 Hz. In some embodiments, the two resonance peaks may both be between 20 Hz-20000 Hz, and the frequency difference between the two resonance peaks may be at least 3000 Hz. In some embodiments, the two resonance peaks may both be between 20 Hz and 20,000 Hz, and the frequency difference between the two resonance peaks may be at least 4000 Hz. The two resonance peaks may both be between 100 Hz-18000 Hz, and the frequency difference between the two resonance peaks may be at least 400 Hz. In some embodiments, the two resonance peaks may both be between 100 Hz and 18000 Hz, and the frequency difference between the two resonance peaks may be at least 1000 Hz. In some embodiments, the two resonance peaks may both be between 100 Hz and 18000 Hz, and the frequency difference between the two resonance peaks may be at least 2000 Hz. In some embodiments, the two resonance peaks may both be between 100 Hz and 18000 Hz, and the frequency difference between the two resonance peaks may be at least 3000 Hz. In some embodiments, the two resonance peaks may both be between 100 Hz and 18000 Hz, and the frequency difference between the two resonance peaks may be at least 4000 Hz. The two resonance peaks may both be between 200 Hz-12000 Hz, and the frequency difference between the two resonance peaks may be at least 400 Hz. In some embodiments, the two resonance peaks may both be between 200 Hz and 12000 Hz, and the frequency difference between the two resonance peaks may be at least 1000 Hz. In some embodiments, the two resonance peaks may both be between 200 Hz and 12000 Hz, and the frequency difference between the two resonance peaks may be at least 2000 Hz. In some embodiments, the two resonance peaks may both be between 200 Hz and 12000 Hz, and the frequency difference between the two resonance peaks may be at least 3000 Hz. In some embodiments, the two resonance peaks may both be between 200 Hz and 12000 Hz, and the frequency difference between the two resonance peaks may be at least 4000 Hz. The two resonance peaks may both be between 500 Hz-10000 Hz, and the frequency difference between the two resonance peaks may be at least 400 Hz. In some embodiments, the two resonance peaks may both be between 500 Hz and 10000 Hz, and the frequency difference between the two resonance peaks may be at least 1000 Hz. In some embodiments, both resonance peaks may be between 500 Hz and 10000 Hz, and the frequency difference between the two resonance peaks may be at least 2000 Hz. In some embodiments, both resonance peaks may be between 500 Hz and 10000 Hz, and the frequency difference between the two resonance peaks may be at least 3000 Hz. In some embodiments, the two resonance peaks may both be between 500 Hz and 10000 Hz, and the frequency difference between the two resonance peaks may be at least 4000 Hz. In this way, the resonance response ranges of the loudspeaker apparatus may be widened, and the sound quality satisfying certain conditions may be obtained. It should be noted that, in actual use, a plurality of vibration conductive plates and vibration boards may be provided to form a multilayer vibration structure that corresponds to different frequency response ranges, which may realize high-quality loudspeaker vibration in the full range and frequency, or make the frequency response curve meet the requirements in some specific frequency ranges. For example, in bone conduction hearing aids, in order to meet normal hearing requirements, earphone cores composed of one or more vibration boards and vibration conductive plates with resonance frequencies in the range of 100 Hz-10000 Hz may be selected. The description of the composite vibration component composed of the vibration board and the vibration conductive plate may be found in, e.g., Chinese Patent Application No. 201110438083.9 entitled "Bone conduction loudspeaker and its composite vibration component" filed on Dec. 23, 2011, the contents of which are hereby incorporated by reference.

Figure 16:
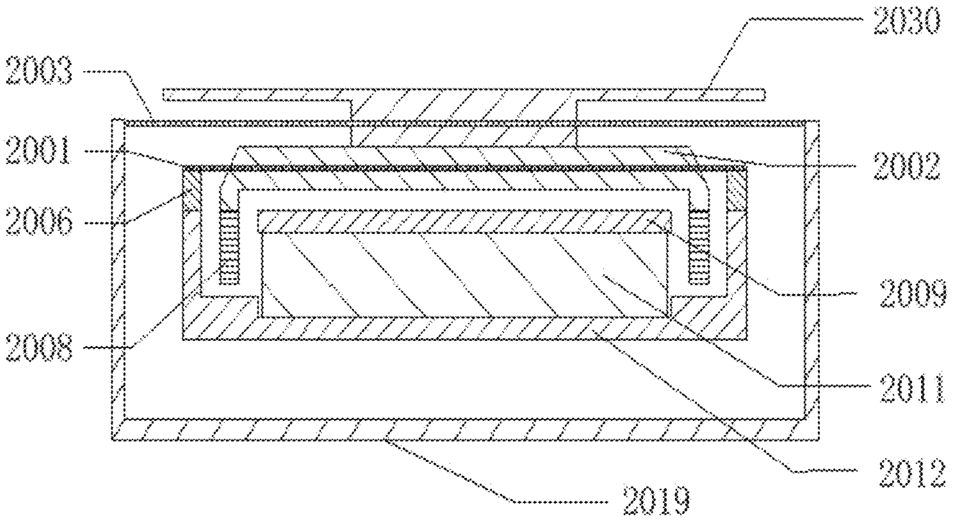
FIG. 16 is a structural schematic diagram illustrating a loudspeaker apparatus and a composite vibration component thereof according to some embodiments of the present disclosure.
Figure 17:
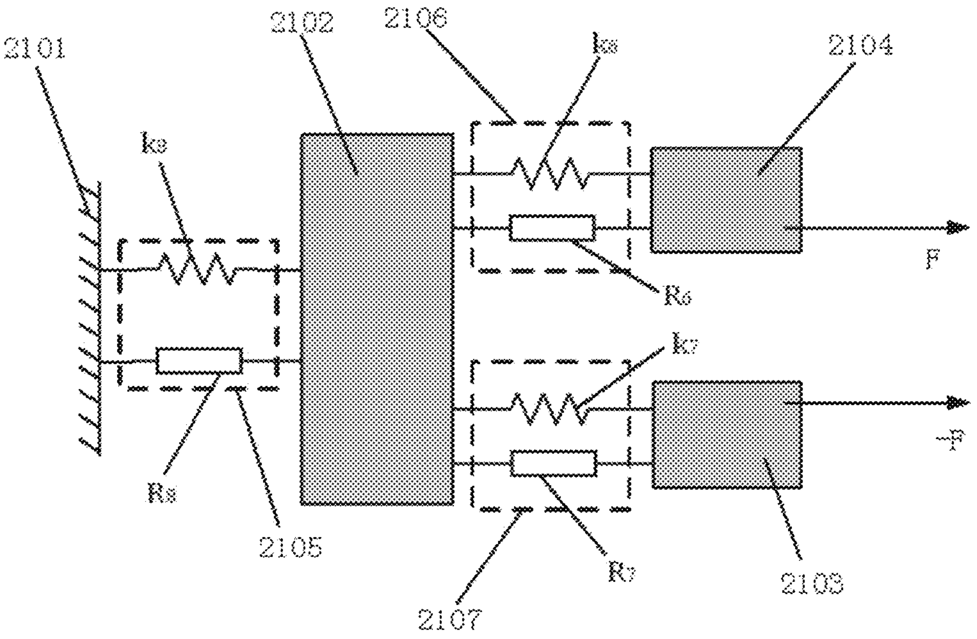
FIG. 17 is a schematic diagram illustrating an equivalent model of a vibration generation component of a loudspeaker apparatus according to some embodiments of the present disclosure.

FIG. 16 is a structural schematic diagram illustrating a loudspeaker apparatus and a composite vibration component thereof according to some embodiments of the present disclosure. FIG. 17 is a schematic diagram illustrating an equivalent model of a vibration generation component of a loudspeaker apparatus according to some embodiments of the present disclosure.

In some embodiments, as shown in FIG. 16, the composite vibration component of the loudspeaker apparatus may include a vibration board 2002, a first vibration conductive plate 2003, and a second vibration conductive plate 2001. The first vibration conductive plate 2003 may fix the vibration board 2002 and the second vibration conductive plate 2001 on the housing 2019 (i.e., the housing 41 of the earphone core). The composite vibration component composed of the vibration board 2002, the first vibration conductive plate 2003 and the second vibration conductive plate 2001 may generate more than two resonance peaks, and a flatter frequency response curve in the audible range of the auditory system may be generated, thereby improving the sound quality of the loudspeaker apparatus.

Figure 18:
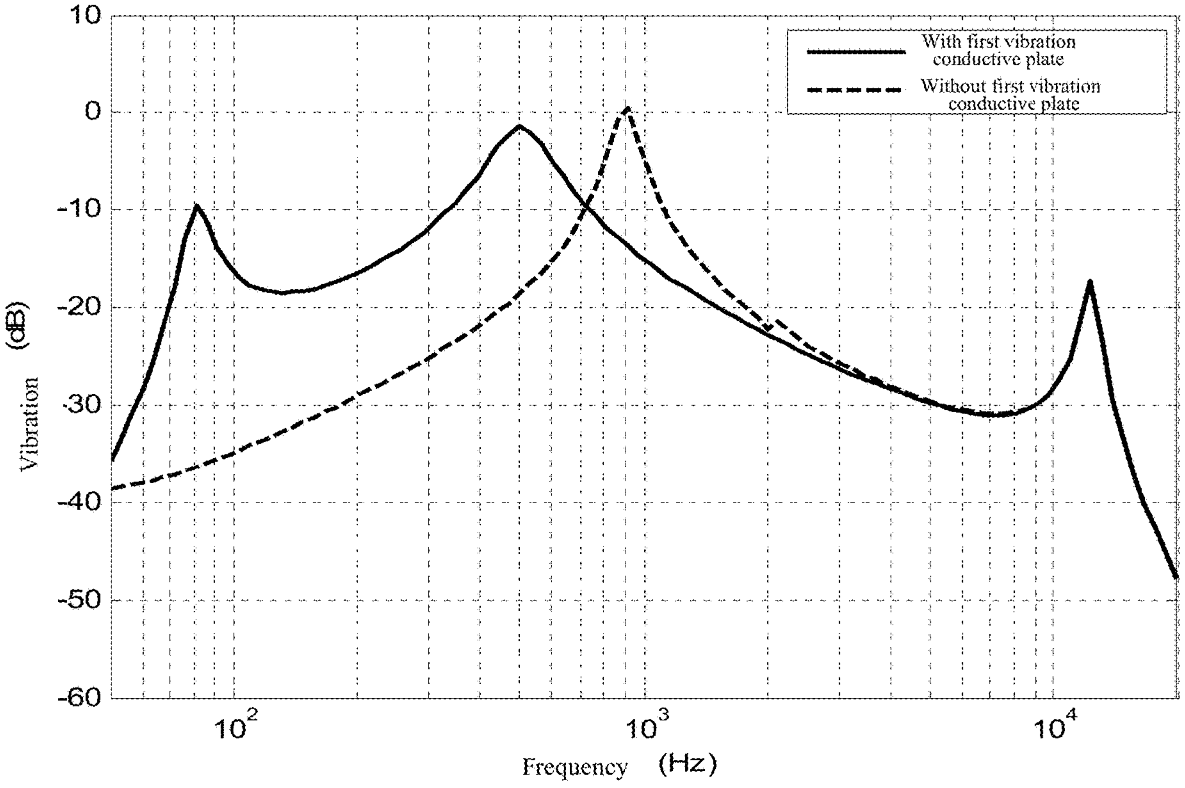
FIG. 18 is a schematic diagram illustrating a vibration response curve of a loudspeaker apparatus according to some embodiments of the present disclosure.

The count of resonance peaks generated by the triple composite vibration system of the first vibration conductive plate may be more than the count of resonance peaks generated by the composite vibration system without the first vibration conductive plate. In some embodiments, the triple composite vibration system may produce at least three resonance peaks. In some embodiments, at least one resonance peak may not be within the frequency range of sound perceivable by the human ear. In some embodiments, all the resonance peaks may be within the frequency range of sound perceivable by the human ears. In some embodiments, all the resonance peaks may be within the frequency range of sound perceivable by the human ears, and their frequencies may not be greater than 18000 Hz. In some embodiments, all the resonance peaks may be within the frequency range of sound perceivable by the human ear, and their frequencies may be between 100 Hz-15000 Hz. In some embodiments, all the resonance peaks may be within the frequency range of sound perceivable by the human ears, and their frequencies may be between 200 Hz-12000 Hz. In some embodiments, all the resonance peaks may be within the frequency range of sound perceivable by the human ears, and their frequencies may be between 500 Hz and 11000 Hz. The frequencies of the resonance peaks may have a certain gap. For example, the frequency difference between at least two resonance peaks may be at least 200 Hz. In some embodiments, the frequency difference between at least two resonance peaks may be at least 500 Hz. In some embodiments, the frequency difference between at least two resonance peaks may be at least 1000 Hz. In some embodiments, the frequency difference between at least two resonance peaks may be at least 2000 Hz. In some embodiments, the frequency difference between at least two resonance peaks may be at least 5000 Hz. In order to achieve better results, all the resonance peaks may be within the frequency range of sound perceivable by the human ears, and the frequency difference between at least two resonance peaks may be at least 500 Hz. In some embodiments, all the resonance peaks may be within the frequency range of sound perceivable by the human ears, and the frequency difference between at least two resonance peaks may be at least 1000 Hz. In some embodiments, all the resonance peaks may be within the frequency range of sound perceivable by the human ears, and the frequency difference between at least two resonance peaks may be at least 1000 Hz. In some embodiments, all the resonance peaks may be within the frequency range of sound perceivable by the human ears, and the frequency difference between at least two resonance peaks may be at least 2000 Hz. In some embodiments, all the resonance peaks may be within the frequency range of sound perceivable by the human ears, and the frequency difference between at least two resonance peaks may be at least 3000 Hz. In some embodiments, all the resonance peaks may be within the frequency range of sound perceivable by the human ears, and the frequency difference between at least two resonance peaks may be at least 4000 Hz. Two of the resonance peaks may be within the frequency range of sound perceivable by the human ears, and the other may not be within the frequency range of sound perceivable by the human ears, and the frequency difference between at least two resonance peaks may be at least 500 Hz. In some embodiments, two of the resonance peaks may be within the frequency range of sound perceivable by the human ears and the other resonance peak may not be within the frequency range of sound perceivable by the human ears, and the frequency difference between at least two resonance peaks may be at least 1000 Hz. In some embodiments, two of the resonance peaks may be within the frequency range of sound perceivable by the human ears and the other resonance peak may not be within the frequency range of sound perceivable by the human ears, and the frequency difference between at least two resonance peaks may be at least 2000 Hz. In some embodiments, two of the resonance peaks may be within the frequency range of sound perceivable by the human ears and the other resonance peak may not be within the frequency range of sound perceivable by the human ears, and the frequency difference between at least two resonance peaks may be at least 3000 Hz. In some embodiments, two of the resonance peaks may be within the frequency range of sound perceivable by the human ears and the other resonance peak may not be within the frequency range of sound perceivable by the human ears, and the frequency difference between at least two resonance peaks may be at least 4000 Hz. One of the resonance peaks may be within the frequency range of sound perceivable by the human ears, the other two resonance peaks may not be within the frequency range of sound perceivable by the human ears, and the frequency difference between at least two resonance peaks may be at least 500 Hz. In some embodiments, one of the harmonic peaks may be within the frequency range of sound perceivable by the human ears and the other two resonance peaks may not be within the frequency range of sound perceivable by the human ears, and the frequency difference between at least two resonance peaks may be at least 1000 Hz. In some embodiments, one of the resonance peaks may be within the frequency range of sound perceivable by the human ears and the other two resonance peaks may not be within the frequency range of sound perceivable by the human ears, and the frequency difference between at least two resonance peaks may be at least 2000 Hz. In some embodiments, one of the resonance peaks may be within the frequency range of sound perceivable by the human ears and the other two resonance peaks may not be within the frequency range of sound perceivable by the human ears, and the frequency difference between at least two resonance peaks may be at least 3000 Hz. In some embodiments, one of the resonance peaks may be within the frequency range of sound perceivable by the human ears and the other two resonance peaks may not be within the frequency range of sound perceivable by the human ears, and the frequency difference between at least two resonance peaks may be at least 4000 Hz. The resonance peaks may all be between 5 Hz-30000 Hz, and the frequency difference between at least two resonance peaks may be at least 400 Hz. In some embodiments, the resonance peaks may all be between 5 Hz-30000 Hz, and the frequency difference between at least two resonance peaks may be at least 1000 Hz. In some embodiments, the resonance peaks may all be between 5 Hz-30000 Hz, and the frequency difference between at least two resonance peaks may be at least 2000 Hz. In some embodiments, the resonance peaks may all be between 5 Hz-30000 Hz, and the frequency difference between at least two resonance peaks may be at least 3000 Hz. In some embodiments, the resonance peaks may all be between 5 Hz-30000 Hz, and the frequency difference between at least two resonance peaks may be at least 4000 Hz. The resonance peaks may all be between 20 Hz-20000 Hz, and the frequency difference between at least two resonance peaks may be at least 400 Hz. In some embodiments, the resonance peaks may all be between 20 Hz-20000 Hz, and the frequency difference between at least two resonance peaks may be at least 1000 Hz. In some embodiments, the resonance peaks may all be between 20 Hz-20000 Hz, and the frequency difference between at least two resonance peaks may be at least 2000 Hz. In some embodiments, the resonance peaks may all be between 20 Hz-20000 Hz, and the frequency difference between at least two resonance peaks may be at least 3000 Hz. In some embodiments, the resonance peaks may all be between 20 Hz-20000 Hz, and the frequency difference between at least two resonance peaks may be at least 4000 Hz. The resonance peaks may all be between 100 Hz-18000 Hz, and the frequency difference between at least two resonance peaks may be at least 400 Hz. In some embodiments, the resonance peaks may all be between 100 Hz-18000 Hz, and the frequency difference between at least two resonance peaks may be at least 1000 Hz. In some embodiments, the resonance peaks may all be between 100 Hz-18000 Hz, and the frequency difference between at least two resonance peaks may be at least 2000 Hz. In some embodiments, the resonance peaks may all be between 100 Hz-18000 Hz, and the frequency difference between at least two resonance peaks may be at least 3000 Hz. In some embodiments, the resonance peaks may all be between 100 Hz-18000 Hz, and the frequency difference between at least two resonance peaks may be at least 4000 Hz. The resonance peaks may all be between 200 Hz-12000 Hz, and the frequency difference between at least two resonance peaks may be at least 400 Hz. In some embodiments, the resonance peaks may all be between 200 Hz-12000 Hz, and the frequency difference between at least two resonance peaks may be at least 1000 Hz. In some embodiments, the resonance peaks may all be between 200 Hz-12000 Hz, and the frequency difference between at least two resonance peaks may be at least 2000 Hz. In some embodiments, the resonance peaks may all be between 200 Hz-12000 Hz, and the frequency difference between at least two resonance peaks may be at least 3000 Hz. In some embodiments, the resonance peaks may all be between 200 Hz-12000 Hz, and the frequency difference between at least two resonance peaks may be at least 4000 Hz. The resonance peaks may all be between 500 Hz-10000 Hz, and the frequency difference between at least two resonance peaks may be at least 400 Hz. In some embodiments, the resonance peaks may all be between 500 Hz-10000 Hz, and the frequency difference between at least two resonance peaks may be at least 1000 Hz. In some embodiments, the resonance peaks may all be between 500 Hz-10000 Hz, and the frequency difference between at least two resonance peaks may be at least 2000 Hz. In some embodiments, the resonance peaks may all be between 500 Hz-10000 Hz, and the frequency difference between at least two resonance peaks may be at least 3000 Hz. In some embodiments, the resonance peaks may all be between 500 Hz-10000 Hz, and the frequency difference between at least two resonance peaks may be at least 4000 Hz. In one embodiment, by using a triple composite vibration system composed of a vibration board, a first vibration conductive plate and a second vibration conductive plate, the frequency response as shown in FIG. 18 can be obtained, which generates three distinct resonance peaks, and further greatly improves the sensitivity of the loudspeaker apparatus in the low frequency range (about 600 Hz) and improves the sound quality.

By changing parameters such as the size and material of the first vibration conductive plate, the position of the resonance peak may be moved to obtain a more ideal frequency response. In some embodiments, the first vibration conductive plate may be an elastic plate. The elasticity may be determined by various aspects such as the material, thickness, and structure of the first vibration conductive plate. The material of the first vibration conductive plate may include but is not limited to, steel (such as but not limited to stainless steel, carbon steel, etc.), light alloy (such as but not limited to aluminum alloy, beryllium copper, magnesium alloy, titanium alloy, etc.), and plastic (such as but not limited to high molecular polyethylene, blown nylon, engineering plastics, etc.), or other single or composite materials capable of achieving the same performance. The composite materials may include, but are not limited to, reinforcement materials such as glass fiber, carbon fiber, boron fiber, graphite fiber, graphene fiber, silicon carbide fiber, or aramid fiber; compounds of organic and/or inorganic materials such as glass fiber reinforced unsaturated polyester, various types of glass steel composed of epoxy resin or phenolic resin. The thickness of the first vibration conductive plate may not be less than 0.005 mm. In some embodiments, the thickness may be 0.005 mm-3 mm. In some embodiments, the thickness may be 0.01 mm-2 mm. In some embodiments, the thickness may be 0.01 mm-1 mm. In some embodiments, the thickness may be 0.02 mm-0.5 mm. The structure of the first vibration conductive plate may be disposed as a ring shape. In some embodiments, the first vibration conductive plate may include at least one ring. In some embodiments, the first vibration conductive plate may include at least two rings, such as a concentric ring, a non-concentric ring. The rings may be connected by at least two support rods that radiate from the outer ring to the center of the inner ring. In some embodiments, the first vibration conductive plate may include at least one elliptical ring. In some embodiments, the first vibration conductive plate may include at least two elliptical rings. Different elliptical rings may have different radii of curvature. In some embodiments, the first vibration conductive plate may include at least one square ring. The structure of the first vibration conductive plate may be disposed as a sheet shape. In some embodiments, a hollow pattern may be disposed on the first vibration conduction plate, and the area of the hollow pattern may not be less than the area without the hollow pattern. The materials, thickness, and structure described above may be combined into different vibration conductive plates. For example, a ring-shaped vibration conductive plate may have different thickness distributions. In some embodiments, the thickness of the support rod(s) may be equal to the thickness of the ring(s). In some embodiments, the thickness of the support rod(s) may be greater than the thickness of the ring(s). In some embodiments, the thickness of the inner ring may be greater than the thickness of the outer ring.

Figure 19:
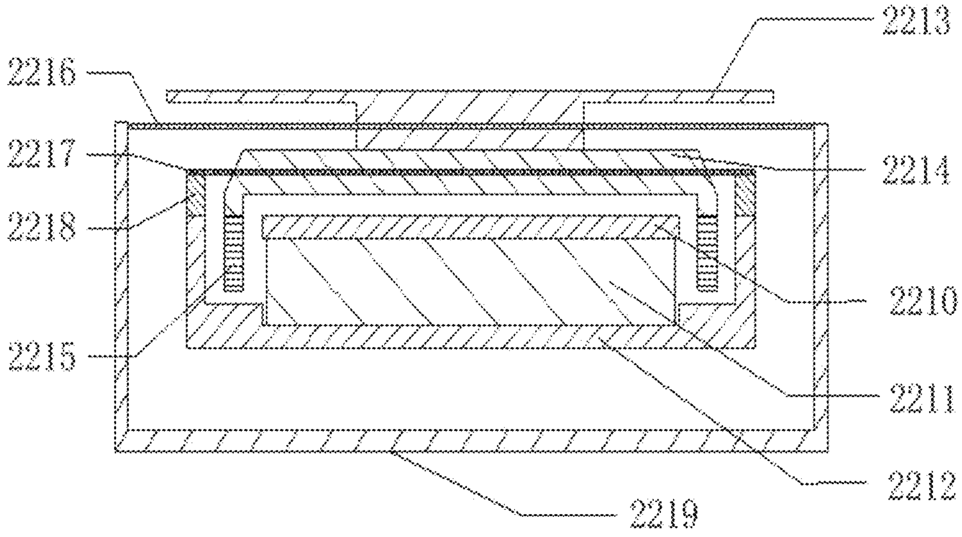
FIG. 19 is a structural schematic diagram illustrating a vibration generation component of a loudspeaker apparatus according to some embodiments of the present disclosure.

The present disclosure also discloses specific embodiments of the vibration board, the first vibration conductive plate, and the second vibration conductive plate. FIG. 19 is a structural schematic diagram illustrating a vibration generation component of a loudspeaker apparatus according to some embodiments of the present disclosure. As shown in FIG. 19, the earphone core may include a magnetic circuit system composed of a magnetic conductive plate 2210, a magnet 2211, and a magnetic conductive body 2212. The earphone core may further include a vibration board 2214, a coil 2215, a first vibration conductive plate 2216, and a second vibration conductive plate 2217. The panel 2213 may protrude from the housing 2219, and be bonded to the vibration board 2214 via glue. The first vibration conductive plate 2216 may fix the earphone core to the housing 2219 to form a suspension structure.

Figure 20:
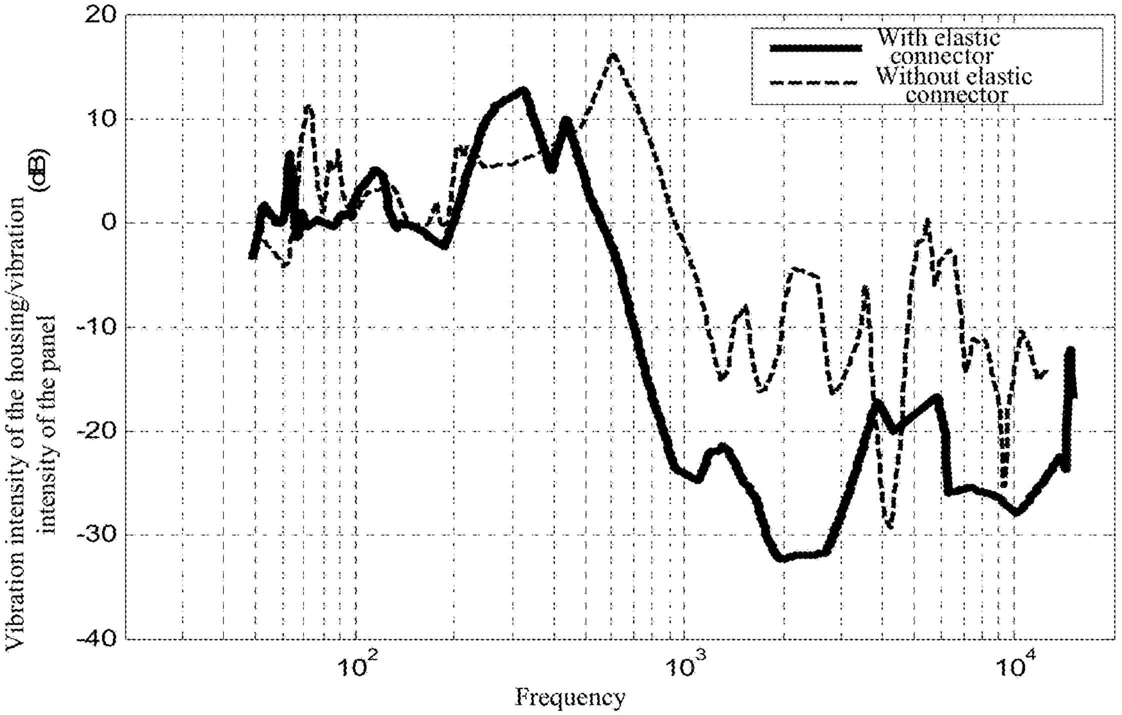
FIG. 20 shows a vibration response curve of a vibration generation component of a loudspeaker apparatus according to some embodiments of the present disclosure.
Figure 21:
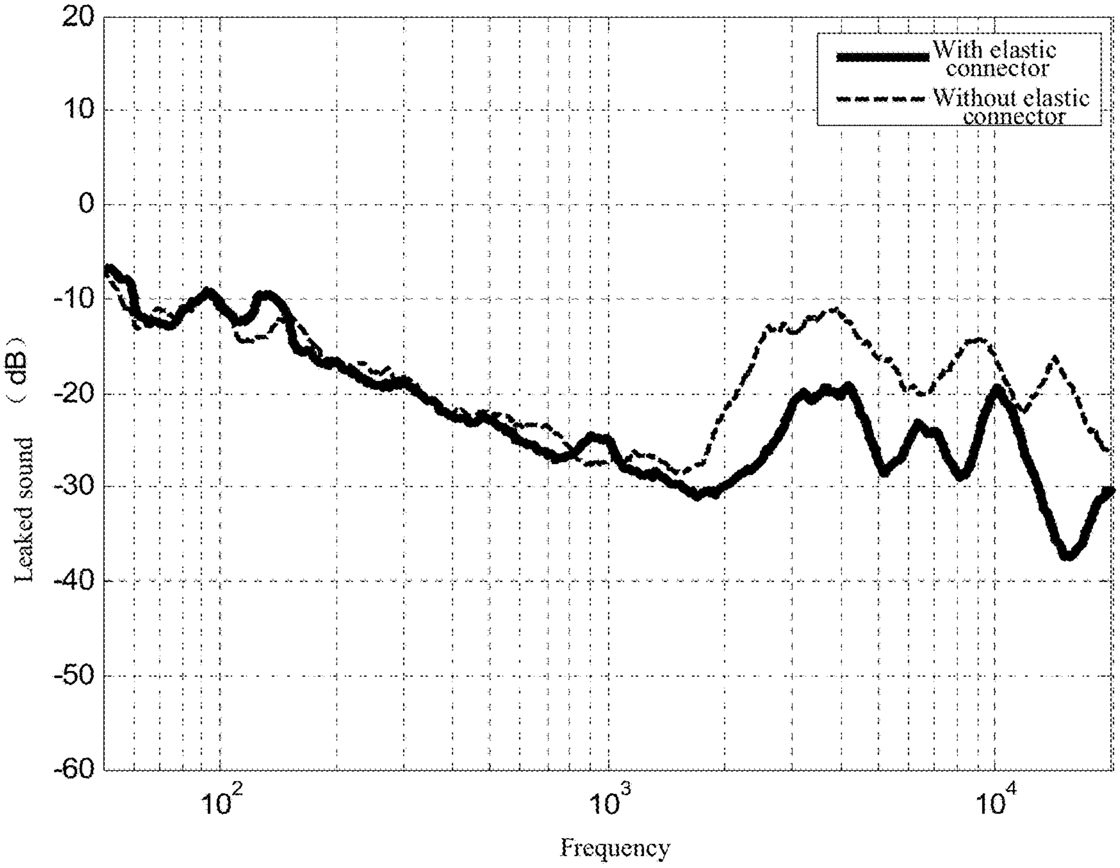
FIG. 21 shows a vibration response curve of a vibration generation component of a loudspeaker apparatus according to some embodiments of the present disclosure.

During the work of the loudspeaker apparatus, the triple vibration generation system composed of the vibration board 2214, the first vibration conductive plate 2216, and the second vibration conductive plate 2217 may generate a flatter frequency response curve, thereby improving the sound quality of the loudspeaker apparatus. The first vibration conductive plate 2216 may elastically connect the earphone core to the housing 2219, which may reduce the vibration transmitted from the earphone core to the housing, thereby effectively reducing leaked sound caused by the vibration of the housing, and reducing the impact of the vibration of the housing on the sound quality of the loudspeaker apparatus. FIG. 20 shows a vibration response curve of a vibration generation component of a loudspeaker apparatus according to some embodiments of the present disclosure. The thick line shows the frequency response of the vibration generation component when the first vibration conductive plate 2216 is used, and the thin line shows the frequency response of the vibration generation component when the first vibration conductive plate 2216 is not used. In some embodiments, in a frequency range above 500 Hz, the vibration of the housing of the loudspeaker apparatus without the first vibration conductive plate 2216 is significantly greater than the vibration of the housing of the loudspeaker apparatus having the first vibration conductive plate 2216. FIG. 21 shows a comparison of leaked sound in the case where the first vibration conductive plate 2216 is included in the loudspeaker apparatus and in the case where the first vibration conductive plate 2216 is not included in the loudspeaker apparatus. The leaked sound of the loudspeaker apparatus having the first vibration conductive plate 2216 in the intermediate frequency (e.g., about 1000 Hz) is less than the leaked sound of the loudspeaker apparatus without the first vibration conductive plate 2216 in the corresponding frequency range. In some embodiments, when the first vibration conductive plate is used between the panel and the housing, the vibration of the housing may be effectively reduced, thereby reducing the leaked sound. In some embodiments, the first vibration conductive plate may be a material including stainless steel, beryllium copper, plastic, polycarbonate materials, etc. The thickness of the first vibration conductive plate may be in the range of 0.01 mm-1 mm.

It should be noted that the above description of the composite vibration component is only a specific example and should not be considered as the only feasible implementation solution. Obviously, for persons having ordinary skills in the art, after understanding the basic principle of the composite vibration component, various modifications and changes may be made in the form and details of the specific ways and steps of implementing the composite vibration component without departing from the principle, but these modifications and changes are still within the scope of the present disclosure. For example, the first vibration conductive plate 2216 may not be limited to the one or two rings, and the count of the rings may be more than two. As another example, the shapes of a plurality of elements of the first vibration conductive plate 2216 may be the same or different (such as a circular ring and/or a square ring). All such variations are within the protection scope of the present disclosure.

Figure 22A:
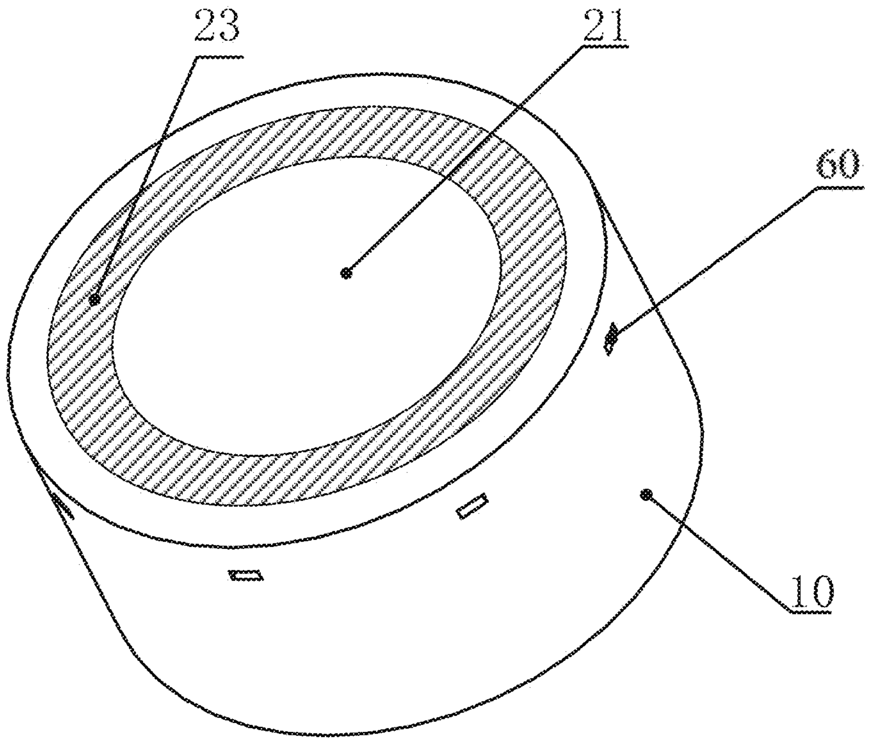
FIG. 22A is a structural schematic diagram illustrating a vibration generation component of a loudspeaker apparatus according to some embodiments of the present disclosure.
Figure 22B:
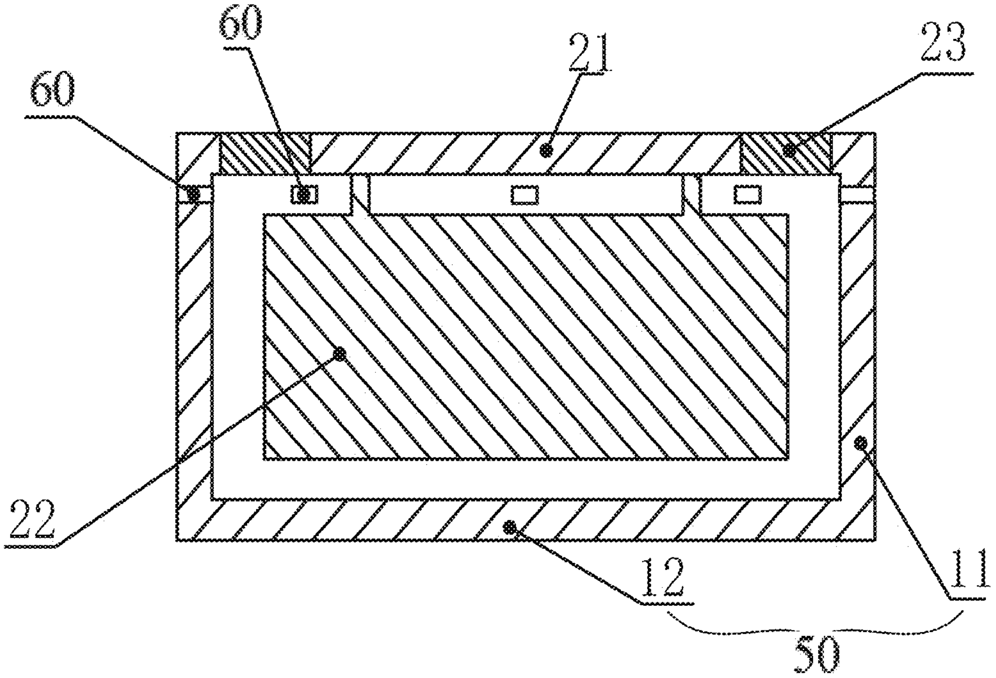
FIG. 22B is a structural schematic diagram illustrating a vibration generation component of a loudspeaker apparatus according to some embodiments of the present disclosure.

FIGS. 22A and 22B are structural schematic diagrams illustrating a vibration generation component of a loudspeaker apparatus according to some embodiments to the present disclosure. In some embodiments, the loudspeaker apparatus may include a housing 50 (i.e., the housing 41 of the earphone core), a panel 21, and an earphone core 22. In some embodiments, the structure of the housing 50 may be the same as the structure of the housing 41 described above, and both may be used to represent the external housing of the loudspeaker module. The earphone core 22 may include the composite vibration component described above. Similarly, the panel 21 may be the same as the panel described above. In some embodiments, the earphone core 22 may be accommodated inside the housing 50 and generate vibration. The vibration of the earphone core 22 may cause the vibration of the housing 50, thereby pushing the air outside the housing to vibrate and generate leaked sound (also referred to as leakage of sound). At least part of the housing 50 may have at least one sounding hole 60. The sounding hole 60 may be configured to guide the sound wave inside the housing generated by the vibration of the air inside the housing 50 to the outside of the housing 50 and interfere with the sound wave from the leaked sound generated by the vibration of the housing 50 by pushing the air outside the housing. In some embodiments, the interference may reduce the amplitude of the sound wave from the leaked sound.

The panel 21 may be fixedly connected to the earphone core 22, and may be synchronously vibrated with the earphone core 22. The panel 21 may protrude from the housing 50 through the opening of the housing 50, and at least partially contact the skin of the human. The vibration may be transmitted to the auditory nerve through the tissues and bones of the human, thereby enabling people to hear sound. The earphone core 22 and the housing 50 may be connected through a connector 23, the connector 23 may position the earphone core 22 in the housing 50.

The connector 23 may include one or more independent components, or may be disposed integrally with the earphone core 22 or the housing 50. In some embodiments, In order to reduce the constraint on the vibration, the connector 23 may be made of an elastic material.

In some embodiments, the sounding hole 60 may be disposed at the upper part of the sidewall along a height direction. For example, the sounding hole 60 may be disposed at ⅓ height of the sidewall from the top (panel 21) along the height direction.

Taking a cylindrical housing as an example, the sounding hole 60 may be disposed at the sidewall 11 and/or the bottom wall 12 of the housing according to different requirements. In some embodiments, the sounding hole 60 may be disposed at the upper part and/or the lower part of the sidewall 11 of the housing. The count of sounding holes may be at least two, which are disposed in the annular circumferential direction. The count of sounding holes at the bottom wall 12 of the housing may be at least two. The sounding holes may be uniformly distributed in a ring shape with the center of the bottom wall as the center of the circle. The sounding holes with the ring-shaped distribution may form at least one circle. The count of sounding holes disposed at the bottom wall 12 of the housing may be only one. The sounding holes may be disposed at the center of the bottom wall 12.

The count of sounding holes may be one or more. In some embodiments, there may be a plurality of sounding holes evenly arranged. For the sounding holes with the ring-shaped distribution, the count of sounding holes per circle may be, for example, 6-8.

The shape of the sounding hole may include circular, oval, rectangular, or stripe. The stripe may generally be arranged along a straight line, a curve, an arc, or the like. The shapes of the sounding holes 60 on a loudspeaker apparatus may be the same or different.

In some embodiments, through sounding holes 60 may be disposed at the lower portion of the sidewall of the housing 50 (⅔ height of the sidewall from the bottom along the height direction). The count of sounding holes 60 may be, for example, eight. The shape of the sounding holes 60 may be, for example, a rectangle. Each sounding hole 60 may be uniformly distributed on the sidewall of the housing 50 in a ring shape.

In some embodiments, the housing 50 may have a cylindrical shape. Through sounding holes 60 may be disposed at a middle portion of the sidewall of the housing 50 (a portion of the sidewall from ⅓ to ⅔ height along the height direction). The count of sounding holes 60 may be 8. The shape of the sounding holes 60 may be rectangular. Each sounding hole 60 may be uniformly distributed on the sidewall of the housing 50 in a ring shape.

In some embodiments, through sounding holes 60 may be disposed along a circumferential direction of the bottom wall of the housing 50. The count of sounding holes 60 may be, for example, eight. The shape of the sounding holes 60 may be, for example, rectangular. Each sounding hole 60 may be uniformly distributed on the bottom wall of the housing 50 in a ring shape.

In some embodiments, the through sounding holes 60 may be respectively disposed at the upper and lower portions of the sidewall of the housing 50. The sounding holes 60 may be uniformly distributed on the upper part and the lower portions of the sidewall of the housing 50 in a ring shape. The count of sounding holes 60 may be eight. In addition, the sounding holes 60 disposed at the upper and lower portions may be symmetrically disposed with respect to a middle portion of the housing 50. The shape of each sounding hole 60 may be circular.

In some embodiments, through sounding holes 60 may be disposed at the upper and lower portions of the sidewall of the housing 50, and the bottom wall of the housing 50, respectively. The sounding holes 60 disposed at the sidewall may be uniformly distributed on the upper and lower portions of the sidewall of the housing 50 in a ring shape, and the count of sounding holes 60 in each circle may be eight. The shape of each sounding hole 60 disposed at on the sidewall may be rectangular. The shape of the sounding holes 60 disposed at the bottom wall may be a stripe arranged along an arc, and the count of sounding holes may be four. The sounding holes 60 may be uniformly distributed in a ring shape with the center of the bottom wall as the circle center. The sounding hole 60 disposed at the bottom wall may include a circular through sounding hole disposed at the center of the bottom wall.

In some embodiments, through sounding holes 60 may be disposed at the upper portion of the sidewall of the housing 50. The sounding holes 60 may be evenly distributed on the upper portion of the sidewall of the housing 50 in a ring shape.

In some embodiments, in order to show good effects on suppressing leaked sound, the sounding holes 60 may be uniformly distributed on the upper, middle, and lower portions of the sidewall 11, respectively. Besides, a circle of sounding holes 60 may be disposed at the bottom wall 12 of the housing 50 in the circumferential direction. The hole size of each sounding hole 60 and/or the count of sounding holes 60 may be the same.

In some embodiments, the sounding hole 60 may be an unobstructed through hole, so that a damping layer may be disposed at the opening of the sounding hole 60. The damping layer may include multiple materials, and the damping layer may be disposed at multiple positions of the sounding holes. For example, the damping layer may include materials that have a certain damping on the sound transmission, such as tuning paper, tuning cotton, non-woven fabric, silk, cotton, sponge, rubber, or the like. The damping layer may be attached to the inner wall of the sounding hole 60, or may be placed on the outside of the sounding hole 60.

In some embodiments, corresponding to different sounding holes, the damping layer may be designed to ensure that different sounding holes 60 have the same phase difference to suppress the leaked sound with the same wavelength. Alternatively, the damping layer may be designed to ensure that different sounding holes have different phase differences to suppress the leaked sound with different wavelengths (that is, the leaked sound of a specific band).

In some embodiments, different parts of a sounding hole 60 may be designed to have the same phase (e.g., using a pre-designed step-shaped damping layer) to suppress the sound waves of the leaked sound with the same wavelength. Alternatively, different parts of the sounding hole 60 may be designed to have different phases to suppress the sound waves of the leaked sound with different wavelengths.

The earphone core 22 may not only drive the panel 21 to vibrate, and the earphone core 22 itself may also be a vibration source, which is accommodated inside the housing 50. The vibration of the surface of the earphone core 22 may cause the air in the housing to vibrate, and the formed sound waves may be inside the housing 50, which can also be referred to as in-housing sound waves. The panel 21 and the earphone core 22 may be positioned on the housing 50 through the connector 23, which will inevitably apply vibration to the housing 50 to drive the housing 50 to vibrate synchronously, so the housing 50 pushes the air outside the housing to vibrate to form the sound waves from the leaked sound. The sound waves from the leaked sound may propagate outward, forming the leaked sound.

The position of the sounding hole may be determined according to the following equation to suppress the leaked sound, and the reduction of the leaked sound is proportional to:

$$(\iint_{s_{hole}} P ds - \iint_{s_{housing}} P_d ds), \quad (4)$$

wherein $S_{hole}$ is the opening area of the sounding hole, and $S_{housing}$ is the housing area that is not in contact with the face of the human.

Pressure inside the housing is denoted as:

$$P = P_a + P_b + P_c + P_e, \quad (5)$$

wherein $P_a$, $P_b$, $P_c$, $P_e$, are sound pressure generated by the a-plane, b-plane, c-plane, and e-plane at any point in the housing space, respectively.

$$P_a(x, y, z) = -j\omega\rho_0 \iint_{S_a} W_a(x_a', y_a') \cdot \frac{e^{jkR(x_a', y_a')}}{4\pi R(x_a', y_a')} dx_a' dy_a' - P_{aresistance}, \quad (6)$$

$$P_b(x, y, z) = -j\omega\rho_0 \iint_{S_b} W_b(x', y') \cdot \frac{e^{jkR(x', y')}}{4\pi R(x', y')} dx' dy' - P_{bresistance}, \quad (7)$$

$$P_c(x, y, z) = -j\omega\rho_0 \iint_{S_c} W_c(x_c', y_c') \cdot \frac{e^{jkR(x_c', y_c')}}{4\pi R(x_c', y_c')} dx_c' dy_c' - P_{cresistance}, \quad (8)$$

-continued $$P_e(x, y, z) = -j\omega\rho_0 \iint_{S_e} W_e(x_e', y_e') \cdot \frac{e^{jkR(x_e', y_e')}}{4\pi R(x_e', y_e')} dx_e' dy_e' - P_{eresistance}, \quad (9)$$

wherein $R(x',y')=\sqrt{(x-x')^2+(y-y')^2+z^2}$ is the distance from the observation point (x,y,z) to a point (x', y', 0) on the b-plane sound source; and $S_a$, $S_b$, $S_c$, $S_e$ are the area domain of a-plane, b-plane, c-plane, and e-plane, respectively; $R(x_a', y_a')=\sqrt{(x-x_a')^2+(y-y_a')^2+(z-z_a)^2}$ is the distance from the observation point (x, y, z) to a point $(x_a', y_a', z_a)$ on the a-plane sound source; $R(x_c', y_c')=\sqrt{(x-x_c')^2+(y-y_c')^2+(z-z_c)^2}$ is the distance from the observation point (x, y, z) to a point $(x_c', y_c', z_c)$ on the c-plane sound source; $R(x_e', y_e')=\sqrt{(x-x_e')^2+(y-y_e')^2+(z-z_e)^2}$ is the distance from the observation point (x, y, z) to a point $(x_e', y_e', z_e)$ on the e-plane sound source; $k=\omega/u$ is a wave number (u is the speed of sound); $\rho_0$ is the density of air; $\omega$ is the angular frequency of vibration; and $P_{aresistance}$, $P_{bresistance}$, $P_{cresistance}$, $P_{eresistance}$ are the sound resistance of the air, which are denoted as:

$$P_{aresistance} = A \cdot \frac{z_a \cdot r + j\omega \cdot z_a \cdot r'}{\varphi} + \delta, \quad (10)$$

$$P_{bresistance} = A \cdot \frac{z_b \cdot r + j\omega \cdot z_b \cdot r'}{\varphi} + \delta, \quad (11)$$

$$P_{cresistance} = A \cdot \frac{z_c \cdot r + j\omega \cdot z_c \cdot r'}{\varphi} + \delta, \quad (12)$$

$$P_{eresistance} = A \cdot \frac{z_e \cdot r + j\omega \cdot z_e \cdot r'}{\varphi} + \delta, \quad (13)$$

wherein r is the sound damping per unit length; r' is the sound mass per unit length; $z_a$ is the distance from the observation point to the a-plane sound source; $z_b$ is the distance from the observation point to the b-plane sound source; $z_c$ is the distance from the observation point to the c-plane sound source; and $z_e$ is the distance from the observation point to the e-plane sound source.

$W_a(x, y)$, $W_b(x, y)$, $W_c(x, y)$, $W_e(x, y)$, $W_d(x, y)$ are the sound source intensities per unit area of the a, b, c, e, and d planes, respectively, which can be derived from the following equation group (14):

$$\begin{cases} F_e = F_a = F - k_1\cos\omega t - \iint_{S_a} W_a(x, y)dxdy - \iint_{S_e} W_e(x, y)dxdy - f \\ F_b = -F + k_1\cos\omega t + \iint_{S_b} W_b(x, y)dxdy - \iint_{S_e} W_e(x, y)dxdy - L \\ F_c = F_d = F_b - k_2\cos\omega t - \iint_{S_c} W_c(x, y)dxdy - f - \gamma \\ F_d = F_b - k_2\cos\omega t - \iint_{S_d} W_d(x, y)dxdy \end{cases} \quad (14)$$

Wherein F is the driving force converted by a transducer; $F_a$, $F_b$, $F_c$, $F_d$, $F_e$ are the driving forces of a, b, c, d, and e, respectively; $S_d$ is the housing (d-plane) area; f is the viscous resistance formed by the small gap in the sidewall, $f=\eta\Delta s(dv/dy)$; L is the equivalent load of the face when the vibration board acts on the face; $\gamma$ is the dissipation energy on the elastic element 2; $k_1$, $k_2$ are the elastic coefficients of elastic element 1 and elastic element 2, respectively; $\eta$ is the viscosity coefficient of fluid; dv/dy is the velocity gradient of the fluid; $\Delta s$ is the cross-sectional area of the object (plate); A is the amplitude; $\varphi$ is the area of the sound field; and $\delta$ is a high-order quantity (derived from the imperfect symmetry of the shape of the housing). At any point outside the housing, the sound pressure generated by the vibration of the housing is:

$$P_d = -j\omega\rho_0 \int\int W_d(x_d', y_d') \cdot \frac{e^{jkR(x_d', y_d')}}{4\pi R(x_d', y_d')} dx_d' dy_d' \tag{15}$$

$R(x_d', y_d') = \sqrt{(x-x_d')^2+(y-y_d')^2+(z-z_d)^2}$ is the distance from the observation point (x, y, z) to a point $(x_d', y_d', z_d)$ on the d-plane sound source.

$P_a$, $P_b$, $P_c$, $P_e$ are functions of positions. When a hole is made at any position on the housing, if the area of the hole is S, the total effect of sound pressure at the hole is $\iint_{s_{hole}} P ds$.

Because the panel 21 on the housing 50 is close to the human tissue, the outputted energy may be absorbed by the human tissue, and only the d-plane pushes the air outside the housing to vibrate, forming the leaked sound. The total effect of the housing pushing the air outside the housing to vibration is $\iint_{s_{housing}} P_d ds$.

In some application scenarios, the goal is to make $\iint_{s_{hole}} P ds$ and $\iint_{s_{housing}} P_d ds$ have the same size and be in the opposite direction to achieve the effect of reducing the leaked sound. Once the basic structure of apparatus is determined, $\iint_{s_{housing}} P_d ds$ cannot be adjusted, so $\iint_{s_{hole}} P ds$ may be adjusted to counteract it with $\iint_{s_{housing}} P_d ds$. $\iint_{s_{hole}} P ds$ may include complete phase and amplitude information, and the phase and amplitude may be related to the size of the housing 50 of the loudspeaker apparatus, the vibration frequency of the earphone core, the position, the shape, the count and size of the sounding hole 60, and whether there is a damping on the sounding hole 60. Thus, by adjusting the position, the shapes and counts of sounding holes and/or increasing damping and/or adjusting damping materials to achieve the purpose of suppressing the leaked sound.

In some embodiments, sound waves in the housing and sound waves from the leaked sound may be equivalent to two sound sources. In some embodiments, the through sounding holes 60 on the wall (e.g., the sidewall, the bottom wall) of the housing 50 may be provided, which may guide the sound waves inside the housing to the outside of the housing, and propagate in the air together with the sound waves from the leaked sound to produce interference, thereby reducing the amplitude of the sound waves from the leaked sound, that is, reducing the leaked sound. Therefore, by disposing sounding holes on the housing, the problem of the leaked sound may be solved or reduced to a certain extent without increasing the volume and weight of the loudspeaker apparatus.

According to the equation deduced by the inventors, it is easily understood by those skilled in the art that the reduction effect of the sound waves from the leaked sound is related to the size of the housing of the loudspeaker apparatus, the vibration frequency of the earphone core, the position, the shape, the count, the size of the sounding hole 60, and whether there is a damping on the sounding hole 60. Therefore, the position, the shape, the count of the sounding holes 60, and damping material on the sounding holes 60 may have a variety of forms according to needs.

Figure 23:
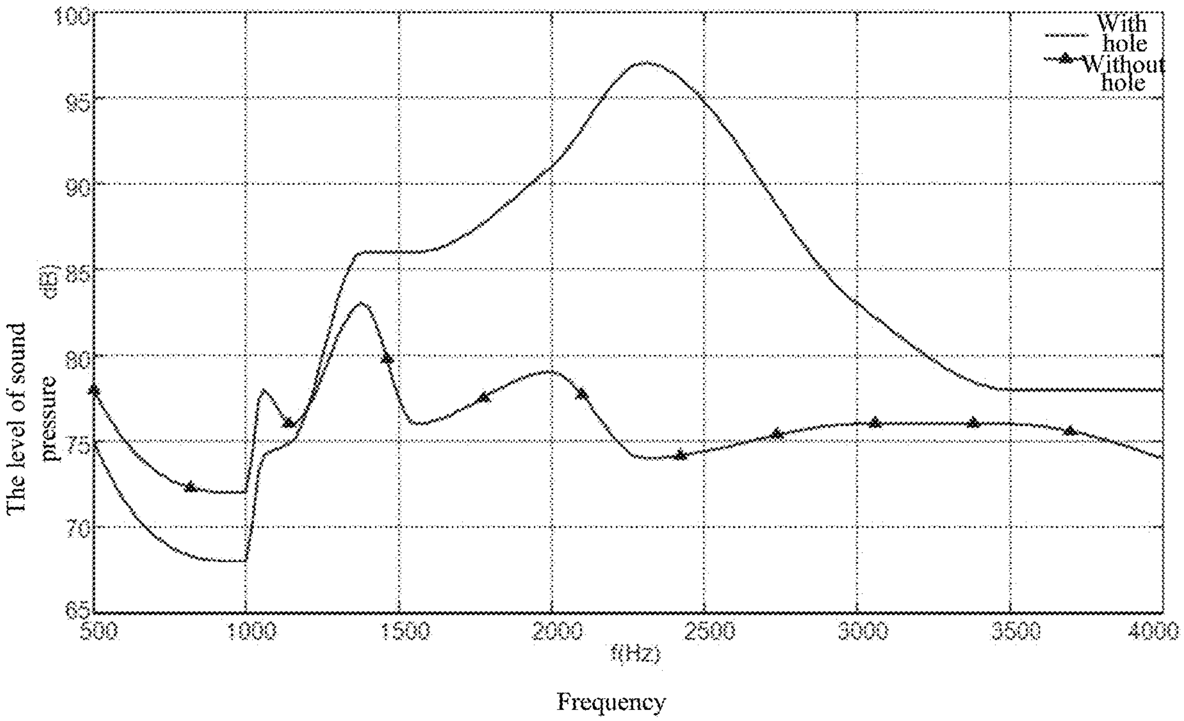
FIG. 23 is a schematics diagram illustrating an effect of suppressing the leaked sound by a loudspeaker apparatus according to some embodiments of the present disclosure.

FIG. 23 is a schematics diagram illustrating an effect of suppressing the leaked sound by a loudspeaker apparatus according to some embodiments of the present disclosure. In the target region of the loudspeaker apparatus (e.g., the loudspeaker apparatus shown in FIGS. 22A and 22B), the phase of the sound wave from the leaked sound transmitting to the target region may be close to 180 degrees from the phase of the sound wave in the housing propagating to the target region through the sounding hole. In this way, the sound wave from the leaked sound generated by the housing 50 can be significantly reduced or even eliminated in the target region.

As shown in FIG. 23, in the frequency range of 1500 Hz~4000 Hz, the sound wave from the leaked sound is significantly suppressed. In the frequency range of 1500 Hz~3000 Hz, the suppressed sound wave from the leaked sound exceeds 10 dB. Especially in the frequency range of 2000 Hz~2500 Hz, when the sounding holes are disposed on the sidewall or the bottom wall of the housing, the leaked sound may be reduced by more than 20 dB compared with no sounding holes disposed on the housing.

It should be noted that the above description of the loudspeaker apparatus is only a specific example and should not be regarded as the only feasible implementation solution. Obviously, for persons having ordinary skills in the art, after understanding the basic principle of the loudspeaker apparatus, various modifications and changes may be made in form and detail of the specific ways and steps of implementing the loudspeaker apparatus without departing from the principle, but these modifications and changes are still within the scope of the present disclosure. For example, the hole sizes of the sounding holes 60 may be different in order to suppress the leaked sound at different wavelengths. All such variations are within the protection scope of the present disclosure.

In some embodiments, the transmission relationship K2 between the sensing terminal 1102 and the vibration unit 1103 (i.e., the housing 41 of the earphone core) may affect the frequency response of the transmission. The sound heard by human ears may be determined based on the energy received by the cochlea. The energy may be affected by different physical quantities during the transmission process and may be expressed as the following equation:

$$P = \iint_s \alpha \cdot f(a, R) \cdot L \cdot ds, \tag{16}$$

wherein P is proportional to the energy received by the cochlea; s represents the area of contact area 502*a* in contact with the human face; a represents a dimensional conversion coefficient; f(a, R) represents the impact of the acceleration a of a point on the contact area and the closeness R of the contact area to the skin on the energy transmission; and L represents the transmission impedance of mechanical wave at any contact point, that is, the transmission impedance per unit area.

It should be noted that the sensing terminal in the foregoing embodiments may have the same structure, and may refer to the auditory system of the human.

It can be known from Equation (16) that, the transmission of sound is affected by the transmission impedance L. The vibration transmission efficiency of the transmission system may be related to L. The frequency response curve of the transmission system may be the superposition of the frequency response curves of the points on the contact area. The factors that affect the impedance may include the size, shape, roughness, the magnitude of force, or the distribution of force, etc. of the energy transmission area. For example, the effect of the sound transmission may be changed by changing the structure and shape of the vibration unit 1202, thereby changing the sound quality of the loudspeaker apparatus. Merely by way of example, changing the corresponding physical characteristics of the contact area 1202*a* of the vibration unit may achieve the effect of changing the sound transmission.

Figure 24:
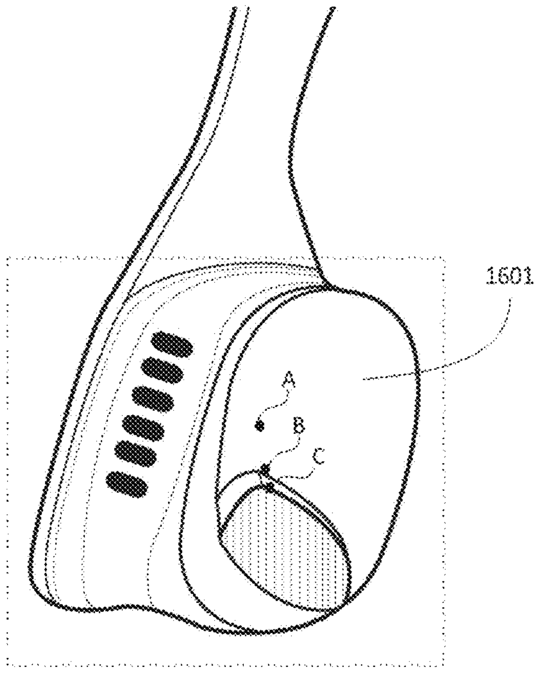
FIG. 24 is a schematic diagram illustrating a contact area of a vibration unit of a loudspeaker apparatus according to some embodiments of the present disclosure.

FIG. 24 is a schematic diagram illustrating a contact area of a vibration unit of a loudspeaker apparatus according to some embodiments of the present disclosure. A surface of the contact area may be disposed with a gradient structure. The gradient structure may refer to a region with a highly variable surface. The contact area herein may be the side of the housing 41 close to the user. The gradient structure may include a hump/concave or stepped structure located outside the contact area (the side that contacts to the user) or a hump/concave or stepped structure located inside the contact area (the side facing away from the user). In some embodiment, the contact area of the vibration unit may contact any position of the head of the user (e.g., the top of the head, forehead, cheeks, horns, auricle, back of auricle, etc.). As shown in FIG. 24, the contact area 1601 (outside the contact area) has a hump or concave part (not shown in FIG. 24). During the work of the loudspeaker apparatus, the hump or concave part may be in contact with the user, changing the pressure when different positions on the contact area 1601 contact the face. The hump part may be in closer contact with the face of the human. The skin and subcutaneous tissue in contact with the hump part may be subjected to more pressure than that in contact with other parts. Accordingly, the skin and subcutaneous tissue in contact with the concave part may be subjected to less pressure than that in contact with other parts. For example, there are three points A, B, and C on the contact area 1601 in FIG. 24, which are respectively located on the non-hump part, the edge of the hump part, and the hump part of the contact area 1601. During in contact with the skin, the clamping force on the skin at the three points A, B, and C is FC>FA>FB. In some embodiments, the clamping force of point B may be 0, that is, point B may not be in contact with the skin. The skin and subcutaneous tissue may show different impedances and responses to sound under different pressures. The impedance ratio may be small at the part with a high pressure, which has a high-pass filtering characteristic for sound waves. The impedance ratio may be large at the part with a low pressure, which has a low-pass filtering characteristic. The impedances L of each part of the contact area 1601 may be different. According to Equation (16), different parts may have different responses to the frequency of sound transmission. The effect of sound transmission through the entire contact area may be equivalent to the sum of sound transmission at each part of the contact area. When the sound is transmitted to the brain, a smooth frequency response curve may be formed, which avoids the occurrence of excessively high resonance peaks at low frequency or high frequency, thereby obtaining an ideal frequency response within the entire sound frequency bandwidth. Similarly, the material and thickness of the contact area 1601 may affect sound transmission, which further affects the sound quality. For example, when the material of the contact area is soft, the effect of sound transmission in the low frequency range may be better than that in the high frequency range. When the material of the contact area is hard, the effect of sound transmission effect in the high frequency range may be better than that in the low frequency range.

Figure 25:
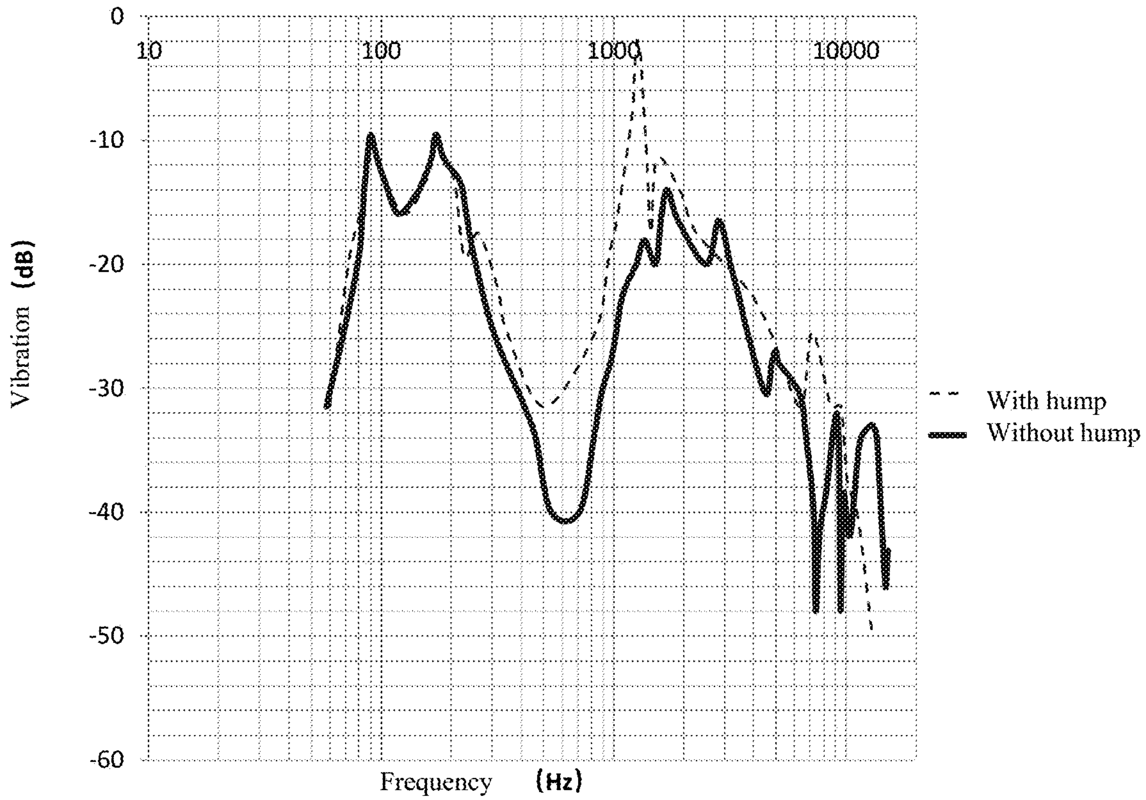
FIG. 25 shows frequency responses of loudspeaker apparatuses having different contact areas according to some embodiments of the present disclosure.

FIG. 25 shows frequency responses of a loudspeaker apparatuses having different contact areas. The dotted line corresponds to the frequency response of the loudspeaker apparatus with a hump structure (or a hump part) on the contact area, and the solid line corresponds to the frequency response of the loudspeaker apparatus without a hump structure (or a hump part) on the contact area. In the mid-low frequency range (e.g., in the frequency range of 300 Hz~1000 Hz), the vibration of loudspeaker apparatus without the hump structure may be significantly weakened compared with the vibration of loudspeaker apparatus having the hump structure, forming a "deep pit" on the frequency response curve, which appears to be a non-ideal frequency response, thereby affecting the sound quality of the loudspeaker apparatus.

The above description of FIG. 25 is only an explanation for a specific example. For persons having ordinary skills in the art, after understanding the basic principle that factors affect the frequency response of the loudspeaker apparatus, various modifications and changes can be made to the structure and components of the loudspeaker apparatus to obtain different frequency response effects.

It should be noted that, for those having ordinary skills in the art, the shape and structure of the contact area 1601 is not limited to the above description, and may meet other specific requirements. For example, the hump or concave part on the contact area may be distributed on the edge of the contact area, or be distributed in the middle of the contact area. The contact area may include one or more hump or concave parts. The hump and concave parts may be distributed on the contact area at the same time. The material of the hump or concave parts on the contact area may be other materials different from the material of the contact area. The material of the hump or concave parts may be flexible material, rigid material, or more suitable material for generating a specific pressure gradient; or may be memory or non-memory material; or may be a single material or a composite material. The structural graphics of the hump or concave part of the contact area may include axisymmetric graphics, center-symmetric graphics, rotational symmetric graphics, asymmetric graphics, or the like. The structural graphics of the hump or concave part of the contact area may be one kind of graphics, or a combination of two or more kinds of graphics. The surface of the contact area may have a degree of smoothness, roughness, and waviness. The position distribution of the hump or concave part of the contact area may include, but is not limited to, axial symmetry distribution, center symmetry distribution, rotational symmetry distribution, asymmetric distribution, etc. The hump or concave part of the contact area may be on the edge of the contact area, or be distributed inside the contact area.

Figure 26:
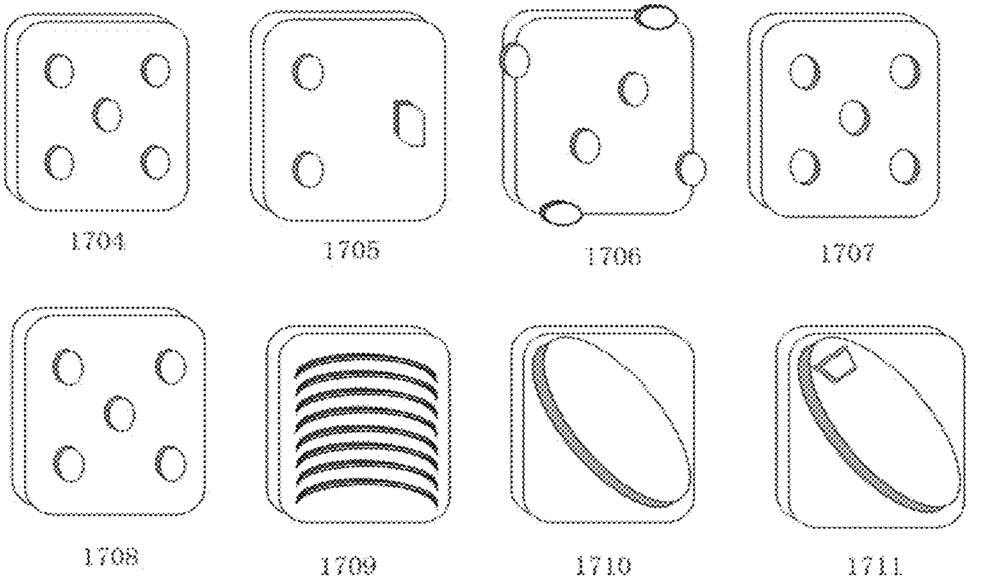
FIG. 26 shows a variety of exemplary structures of a contact area apparatus according to some embodiments of the present disclosure.

FIG. 26 shows a variety of exemplary structures of a contact area according to some embodiments of the present disclosure. Schematic diagram 1704 shown in FIG. 26 is an example illustrating a plurality of humps (also referred to as hump parts) with similar shapes and structures on the contact area. The humps may be made of the same or similar materials as the other parts of the panel, or be made of different materials from the other parts of the panel. In particular, the humps may be composed of a memory material and a vibration transmission layer material, and the proportion of the memory material may not be less than 10%. In some embodiments, the proportion of the memory material in the humps may not be less than 50%. The area of a single hump may account for 1%-80% of the total area of the contact area. In some embodiments, the area of the single hump may account for 5%-70% of the total area of the contact area. More In some embodiments, the area of the single hump may account for 8%-40% of the total area of the contact area. The area of all humps may account for 5%-80% of the total area of the contact area. In some embodiments, the area of all humps may account for 10%-60% of the total area of the contact area. There may be at least one hump. In some embodiments, there may be one hump. In some embodiments, there may be two humps. In some embodiments, there may be at least five humps. The shape of the hump(s) may be a circle, an oval, a triangle, a rectangle, a trapezoid, an irregular polygon, or other similar graphics. The structure of the humps (or the hump parts) may be symmetrical or asymmetrical. The position distribution of the humps (or the hump parts) may be symmetrical or asymmetrical. The count of humps (or the hump parts) may be one or more. The heights of the humps (or the hump parts) may be or may not be the same. The heights and distribution of the humps (or the hump parts) may constitute a certain gradient.

Schematic diagram 1705 shown in FIG. 26 is an example illustrating a structure of humps (or hump parts) on the contact area that includes two or more graphics. The count of humps with different graphics may be one or more. Two or more shapes (or graphics) of the humps may be any two or more combinations of a circle, an oval, a triangle, a rectangle, a trapezoid, an irregular polygon, or other similar graphics. The material, quantity, area, symmetry, etc. of the humps may be similar to those in schematic diagram 1704.

Schematic diagram 1706 shown in FIG. 26 is an example illustrating a plurality of humps (or hump parts) distributed at the edge and inside of the contact area. The count of the humps may not be limited to that shown in FIG. 26. The ratio of the count of humps located at the edge of the contact area to the total count of humps may be 1%-80%. In some embodiments, the ratio may be 5%-70%. In some embodiments, the ratio may be 10%-50%. In some embodiments, the ratio may be 30%-40%. The material, quantity, area, shape, symmetry, etc. of the humps may be similar to those in schematic diagram 1704.

Schematic diagram 1707 shown in FIG. 26 is an example illustrating a structure of concave parts on the contact area. The structure of the concave parts may be symmetrical or asymmetrical. The position distribution of the concave parts may be symmetrical or asymmetrical. The count of concave parts may be one or more. The shape of the concave parts may be the same or different. The concave parts may be hollow. The area of a single concave part may account for 1%-80% of the total area of the contact area. In some embodiments, the area of the single concave part may account for 5%-70% of the total area of the contact area. In some embodiments, the area of the single concave part may account for 8%-40% of the total area of the contact area. The area of all the concave parts may account for 5%-80% of the total area of the contact area. In some embodiments, the area of all the concave parts may account for 10%-60% of the total area of the contact area. There may be at least one concave parts. In some embodiments, there may be one concave part. In some embodiments, there may be two concave parts. In some embodiments, there may be at least five concave parts. The shape of the concave part(s) may include a circle, an oval, a triangle, a rectangle, a trapezoid, an irregular polygon, or other similar graphics.

Schematic diagram 1708 shown in FIG. 26 is an example where a contact area has both hump parts and concave parts. The count of hump parts and/or concave parts may not be limited to one or more. The ratio of the count of concave parts to the count of hump parts may be 0.1-100. In some embodiments, the ratio may be 1-80. In some embodiments, the ratio may be 5-60. In some embodiments, the ratio may be 10-20. The material, the area, the shape, the symmetry, etc. of a single hump part/concave part may be similar to those in schematic diagram 1704.

Schematic diagram 1709 in FIG. 26 is an example of a contact area with a certain count of ripples. The ripples may be generated by combining more than two hump parts/concave parts, or combining the hump parts and the concave parts. In some embodiments, the distance between adjacent hump parts/concave parts may be equal. In some embodiments, the distance between the hump parts/concave parts may be arranged equally.

Schematic diagram 1710 in FIG. 26 is an example of a contact area having a hump (or hump part) with a large area. The area of the hump may account for 30%-80% of the total area of the contact area. In some embodiments, part of the edge of the hump may be substantially in contact with part of the edge of the contact area.

Schematic diagram 1711 in FIG. 26 is an example of a contact area having a first hump (or hump part) with a larger area and a second hump with a smaller area on the first hump. The larger area of the hump may account for 30%-80% of the total area of the contact area. The smaller area of the hump may account for 1%-30% of the total area of the contact area. In some embodiments, the smaller area of the hump may account for 5%-20% of the total area of the contact area. The smaller area may account for 5%-80% of the larger area. In some embodiments, the smaller area may account for 10%-30% of the larger area.

The above description of the structure of the contact area of the loudspeaker apparatus is only a specific example, and should not be regarded as the only feasible implementation solution. Obviously, for persons having ordinary skills in the art, after understanding the basic principle that the structure of the contact area will affect the sound quality of the loudspeaker apparatus, various modifications and changes may be made in the forms and details of the specific ways of implementing the contact area of the loudspeaker apparatus without departing from the principle, but these modifications and changes are still within the scope of the present disclosure. For example, the count of hump parts or concave parts is not limited to that shown in FIG. 26. The hump parts, the concave parts, or the surface pattern of the contact area described above may be modified to a certain extent, and these modifications are still within the protection scope of the present disclosure. Moreover, the contact area of the one or more vibration unit contained in the loudspeaker apparatus may use the same or different shapes and materials. The vibration effect transmitted on different contact areas may vary according to the property of the contact area, thereby obtaining different sound quality effects.

Figure 27:
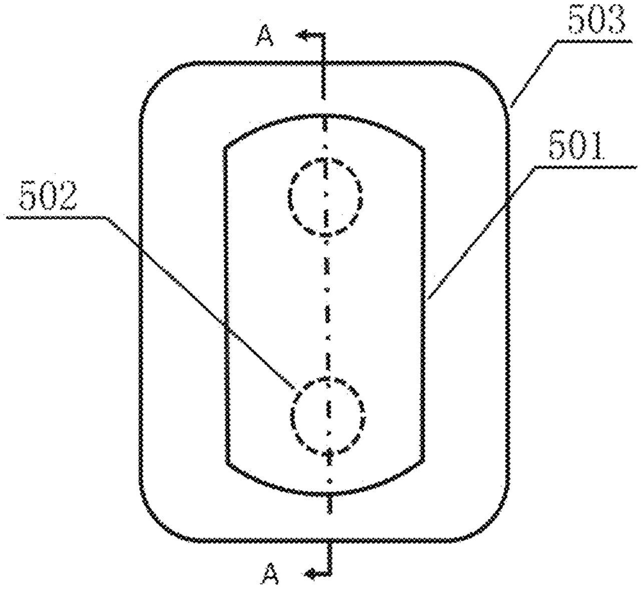
FIG. 27 is a schematics diagram illustrating a top view of a panel bonding way of a loudspeaker apparatus according to some embodiments of the present disclosure.
Figure 28:
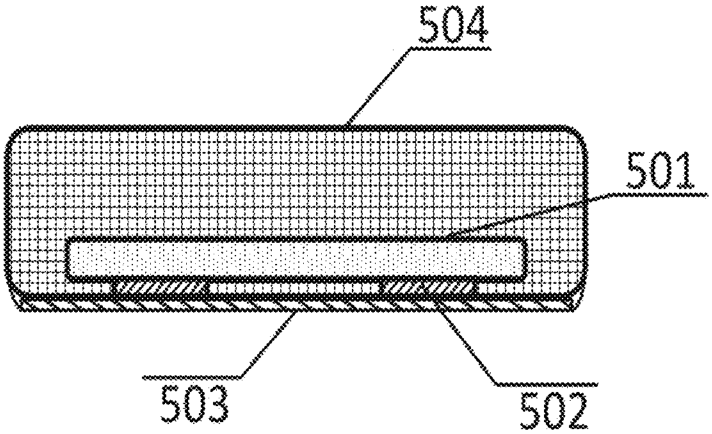
FIG. 28 is a schematics diagram illustrating a top view of a panel bonding way of a loudspeaker apparatus according to some embodiments of the present disclosure.

In some embodiments, the side of the housing 41 close to the user may be composed of a panel 501 and a vibration transmission layer 503. FIGS. 27 and 28 are schematic diagrams illustrating the top views of a panel bonding way of a loudspeaker apparatus according to some embodiments of the present disclosure.

In some embodiments, a vibration transmission layer may be disposed at an outer surface of a sidewall of the housing 20 that contacts the human. The vibration transmission layer may be a specific embodiment of changing the physical characteristics of the contact area of the vibration unit to change the sound transmission effect. Different regions on the vibration transmission layer 503 may have different transmission effects on vibration. For example, the vibration transmission layer 503 may include a first contact area region and a second contact area region. In some embodiments, the first contact area region may not be attached to the panel, and the second contact area region may be attached to the panel. In some embodiments, when the vibration transmission layer 503 is in contact with the user directly or indirectly, the clamping force on the first contact area region may be less than the clamping force on the second contact area region (the clamping force herein refers to the pressure between the contact area of the vibration unit and the user).

In some embodiments, the first contact area region may not be in contact with the user directly, and the second contact area region may be in contact with the user directly and may transmit vibration. The area of the first contact area region may be different from the area of the second contact area region. In some embodiments, the area of the first contact area region may be less than the area of the second contact area region. In some embodiments, the first contact area region may include small holes to reduce the area of the first contact region. The outer surface of the vibration transmission layer 503 (that is, the surface facing the user) may be flat or uneven. In some embodiments, the first contact area region and the second contact area region may not be on the same plane. In some embodiments, the second contact area region may be higher than the first contact area region. In some embodiments, the second contact area region and the first contact area region may constitute a stepped structure. In some embodiments, the first contact area region may be in contact with the user, and the second contact area region may not be in contact with the user. The materials of the first contact area region and the second contact area region may be the same or different. The materials of the first contact area region and/or the second contact area region may include the materials of the vibration transmission layer 503 described above.

The above description of the clamping force on the contact area is just an example of the present disclosure. Those skilled in the art may modify the structure and manner described above according to actual requirements, and these modifications are still within the protection scope of the present disclosure. For example, the vibration transmission layer 503 may not be necessary, and the panel may contact the user directly. The panel may be disposed with different contact area regions. The different contact area regions may have similar properties to the first contact area region and/or the second contact area region described above. As another example, a third contact area region may be disposed on the contact area. The structure of the third contact area region may be different from structure of the first contact area region and/or the second contact area region. The structures may achieve certain effects in reducing vibration of the housing, suppressing the leaked sound, and improving the frequency response curve of the vibration unit.

As shown in FIGS. 27 and 28, in some embodiments, the panel 501 and the vibration transmission layer 503 may be bonded by glue 502. The glued joints may be located at both ends of the panel 501. The panel 501 may be located in a housing formed by the vibration transmission layer 503 and the housing 504. In some embodiments, the projection of the panel 501 on the vibration transmission layer 503 may be a first contact area region, and a region located around the first contact area region may be a second contact area region.

Figure 29:
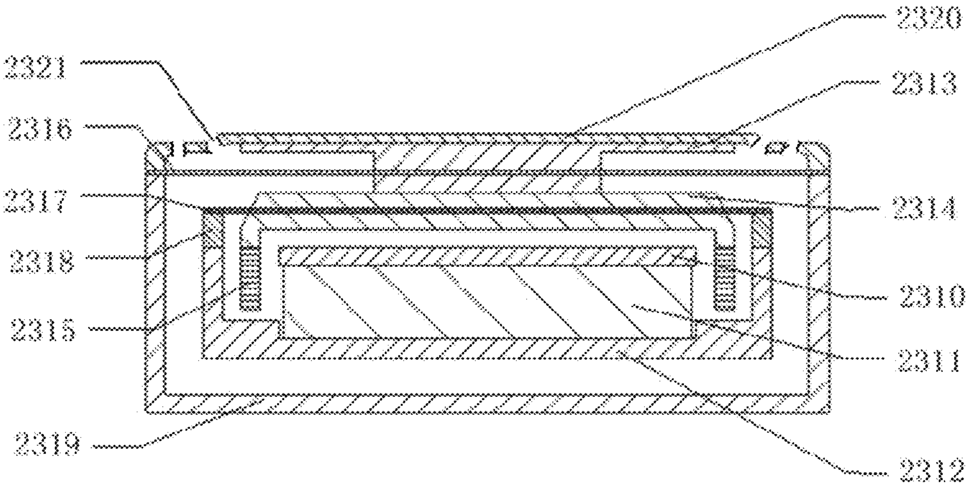
FIG. 29 is a schematics diagram illustrating a structure of a vibration generation component of a loudspeaker apparatus according to some embodiments of the present disclosure.

In some embodiments, as shown in FIG. 29, the earphone core may include a magnetic circuit system consisting of a magnetic conductive plate 2310, a magnet 2311, and a magnetic conductive body 2312. The earphone core may also include a vibration board 2314, a coil 2315, a first vibration conductive plate 2316, a second vibration conductive plate 2317, and a washer 2318. The panel 2313 may protrude from the housing 2319 and be bonded to the vibration board 2314 by glue. The first vibration conductive plate 2316 may fix the earphone core to the housing 2319 to form a suspension structure. A vibration transmission layer 2320 (e.g., silica gel) may be added to the panel 2313, and the vibration transmission layer 2320 may generate deformation to adapt to the shape of the skin. A portion of the vibration transmission layer 2320 that is in contact with the panel 2313 may be higher than a portion of the vibration transmission layer 2320 that is not in contact with the panel 2313, thereby forming a stepped structure. One or more small holes 2321 may be disposed on the portion where the vibration transmission layer 2320 does not contact the panel 2313 (a portion where the vibration transmission layer 2320 does not protrude in FIG. 29). The small holes on the vibration transmission layer may reduce the leaked sound. Specifically, the connection between the panel 2313 and the housing 2319 through the vibration transmission layer 2320 may be weakened, and the vibration transmitted from the panel 2313 to the housing 2319 through the vibration transmission layer 2320 may be reduced, thereby reducing the leaked sound generated by the vibration of the housing 2319. The area of the non-protruding portion of the vibration transmission layer 2320 may be reduced by disposing the small holes 2321, which may drive less air and reduce the leaked sound caused by air vibration. When the small holes 2321 are disposed on the non-protruding part of the vibration transmission layer 2320, the air vibration in the housing may be guided out of the housing and counteract the air vibration caused by the housing 2319, thereby reducing the leaked sound. It should be noted that, since the small holes 2321 may guide the sound waves in the housing of the composite vibration component, and the guided sound waves may be superimposed with the sound waves from the leaked sound to reduce the leaked sound, the small holes may also be the sounding holes.

In some embodiments, the vibration transmission layer 503 in the embodiment may have the same structure as the vibration transmission layer described in the foregoing embodiments. Similarly, the panel in the embodiment may have the same structure as the panel described in the foregoing embodiments. The earphone core may include the composite vibration component described in the foregoing embodiments.

Different from the foregoing embodiments, in some embodiments, the panel 2313 may protrude from the housing of the loudspeaker apparatus. The first vibration conductive plate 2316 may be used to connect the panel 2313 and the housing 2319 of the loudspeaker apparatus, and the coupling degree between the panel 2313 and the housing 2319 may be greatly reduced. The first vibration conductive plate 2316 may provide a certain deformation, so that the panel 2313 has a higher degree of freedom when the panel contacts the user, and may be better adapted to contact surfaces. The first vibration conductive plate 2316 may make the panel 2313 tilt at a certain angle relative to the housing 2319. In some embodiments, the tilt angle may not exceed 5°.

Figure 30:
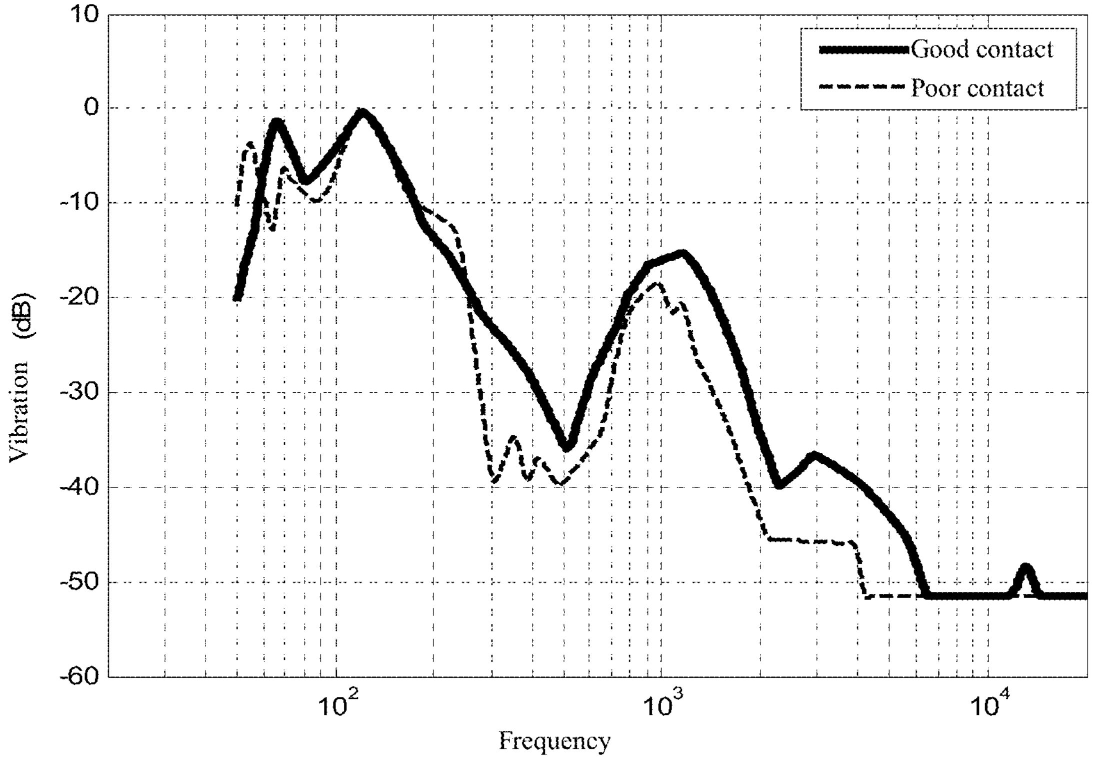
FIG. 30 shows a vibration response curve of a vibration generation component of a loudspeaker apparatus according to some embodiments of the present disclosure.

Further, the vibration efficiency of the loudspeaker apparatus may vary with the contact state. Good contact state may have higher vibration transmission efficiency. As shown in FIG. 30, the thick line shows the vibration transmission efficiency in a good contact state, and the thin line shows the vibration transmission efficiency in a poor contact state. In some embodiments, better contact state may have higher vibration transmission efficiency.

Figure 31:
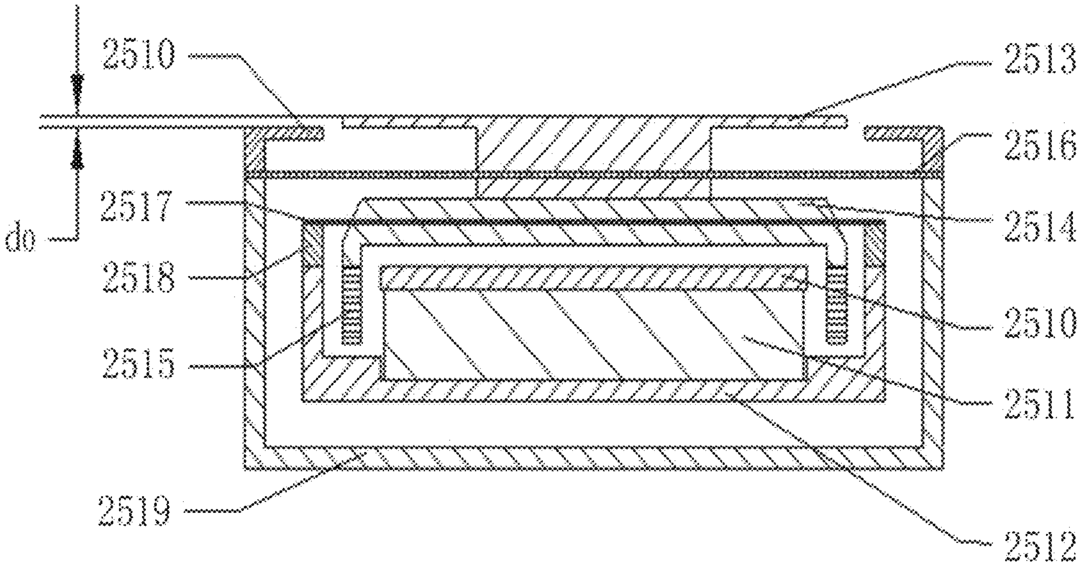
FIG. 31 is a schematic diagram illustrating a structure of a vibration generation component of a loudspeaker apparatus according to some embodiments of the present disclosure.

FIG. 31 is a structural schematic diagram illustrating a vibration generation component of a loudspeaker apparatus according to some embodiments of the present disclosure. As shown in FIG. 31, in this embodiment, the earphone core may include a magnetic circuit system composed of a magnetic conductive plate 2510, a magnet 2511 and a magnetic conductive plate 2512, a vibration board 2514, a coil 2515, a first vibration conductive plate 2516, a second vibration conductive plate 2517, and a washer 2518. The panel 2513 may protrude from the housing 2519, and may be bonded to the vibration board 2514 by glue. The first vibration conductive plate 2516 may fix the earphone core to the housing 2519 to form a suspension structure.

The difference between this embodiment and the foregoing embodiments is that a surrounding edge is added to the edge of the housing. When the housing contacts the skin, the surrounding edge may make the force distribution relatively uniform and increase the comfort level of wearing the loudspeaker apparatus. There is a height difference do between the surrounding edge 2510 and the panel 2513. The force of the skin on the panel 2513 may reduce the distanced between the panel 2513 and the surrounding edge 2510. When the pressure between the loudspeaker apparatus and the user is greater than the force that the first vibration conductive plate 2516 suffers when the deformation of the first vibration conductive plate 2516 is do, excessive clamping force will be transmitted to the skin through the surrounding edge 2510 without affecting the clamping force of the vibration part, which makes the clamping force more uniform, thereby improving the sound quality.

In some embodiments, the first vibration conductive plate may have the same structure as the first vibration conductive plate described in the foregoing embodiments. The second vibration conductive plate may have the same structure as the second vibration conductive plate described in the foregoing embodiments. The washer, the panel, the housing may have the same structure as the washer, the panel, the housing described in the foregoing embodiments.

Under normal circumstances, the sound quality of the loudspeaker apparatus may be affected by multiple factors such as the physical properties of the components of the loudspeaker apparatus, the vibration transmission relationship between the components, the vibration transmission relationship between the loudspeaker apparatus and outside components, and the efficiency of the vibration transmission system when transmitting vibration. The loudspeaker apparatus may include a component that generates vibration (e.g., the earphone cores), a component that fixes the loudspeaker apparatus (e.g., the ear hook 20/the housing 41), a component that transmits vibration (such as but not limited to panels, vibration transmission layers, etc.), or the like, or any combination thereof. The vibration transmission relationship between the components and the vibration transmission relationship between the loudspeaker apparatus and the outside components may be determined by the contact way between the loudspeaker apparatus and the user (such as but not limited to clamping force, contact area, contact shape, etc.).

It should be noted that the above description of the loudspeaker apparatus is only a specific example and should not be considered as the only feasible implementation solution. Obviously, for persons having ordinary skills in the art, after understanding the basic principle of the loudspeaker apparatus, various modifications and changes may be made in the forms and details of specific ways of implementing the loudspeaker apparatus without departing from the principle, but these modifications and changes are still within the scope of the present disclosure. For example, the vibration transmission layer may not be limited to one layer shown in FIG. 29. The vibration transmission layer may include multiple layers. The count of layers of the vibration transmission layer may be determined according to actual requirements, and is not limited in the present disclosure. As another example, the stepped structure formed between the vibration transmission layer and the panel is not limited to only one stepped structure shown in FIG. 29. When there may be multiple vibration transmission layers, the stepped structure may be formed between each vibration transmission layer and the panel, and/or between the vibration transmission layers. All such variations are within the protection scope of the present disclosure.

In some embodiments, the loudspeaker apparatus described above may transmit sound to the user through air conduction. When transmitting the sound by means of air conduction, the loudspeaker apparatus may include one or more sound sources. The sound sources may be located at a specific position of the user's head, such as the top of the head, the forehead, the cheek, the horn, an auricle, back of an auricle, etc., which may not block or cover the ear canal. For the purpose of description, FIG. 32 is a schematic diagram illustrating a sound transmission way through air conduction according to some embodiments of the present disclosure.

Figure 32:
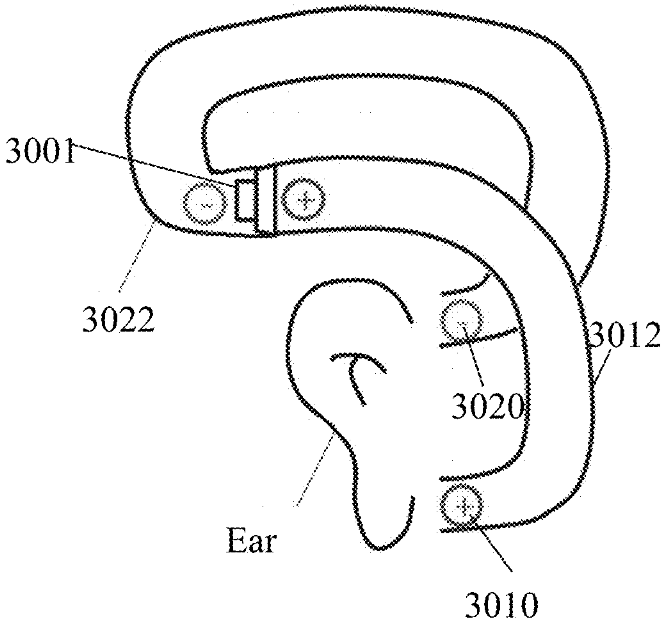
FIG. 32 is a schematic diagram illustrating a sound transmission way through air conduction according to some embodiments of the present disclosure.

As shown in FIG. 32, the sound source 3010 and the sound source 3020 may generate sound waves with opposite phases ("+" and "−" in FIG. 32 indicate opposite phases). For simplicity, the sound source mentioned here refers to a sound output hole on the loudspeaker apparatus. For example, the sound source 3010 and the sound source 3020 may be two sound output holes located at specific positions on the loudspeaker apparatus (e.g., the housing 41 of the earphone core, or the housing of the circuit), respectively.

In some embodiments, the sound source 3010 and the sound source 3020 may be generated by the same vibration apparatus 3001. The vibration apparatus 3001 may include a vibrating diaphragm (not shown in FIG. 32). When the vibrating diaphragm is driven by an electric signal to vibrate, the front side of the vibrating diaphragm drives air to vibrate, and the sound source 3010 may be formed at the sound output hole through the sounding channel 3012. The back side of the vibrating diaphragm drives air to vibrate, and the sound source 3020 may be formed at the sound output hole through the sounding channel 3022. The sounding channel may refer to a sound propagation route from the vibrating diaphragm to the corresponding sounding hole. In some embodiments, the sounding channel may be a route surrounded by a specific structure (e.g., the housing 41 of the earphone core, the housing of the circuit) on the loudspeaker apparatus. It should be noted that, in some alternative embodiments, the sound source 3010 and the sound source 3020 may be produced by different vibration apparatus, respectively, through different vibrating diaphragms.

For the sound generated by the sound source 3010 and the sound source 3020, part of the sound may be transmitted to the user's ear to form the sound heard by the user, and the other part may be transmitted to the environment to form the leaked sound. Considering that the sound source 3010 and the sound source 3020 are relatively close to the user's ear, for convenience of description, the sound transmitted to the user's ear may be called near-field sound, and the leaked sound transmitted to the environment may be called far-field sound. In some embodiments, the near-field/far-field sound with different frequencies generated by the loudspeaker apparatus may be related to the distance between the sound source 3010 and the sound source 3020. Generally speaking, the near-field sound generated by the loudspeaker apparatus will increase as the distance between the two sound sources increases, and the far-field sound (leaked sound) generated by the loudspeaker apparatus will increase as the increase of frequency.

For sounds with different frequencies, the distance between the sound source 3010 and the sound source 3020 may be designed separately, so that the low-frequency near-field sound generated by the loudspeaker apparatus (e.g., sound with a frequency of less than 800 Hz) may be large as possible, and the high-frequency far-field sound (e.g., a sound with a frequency greater than 2000 Hz) may be as small as possible. In order to achieve the above purpose, the loudspeaker apparatus may include two or more sets of dual sound sources. Each set of dual sound sources may include two sound sources similar to the sound source 3010 and the sound source 3020, and respectively generate sounds with specific frequencies. Specifically, the first set of dual sound sources may be used to generate low-frequency sound, and the second set of dual sound sources may be used to generate high-frequency sound. In order to obtain a relatively large low-frequency near-field sound, the distance between two sound sources in the first set of dual sound sources may be designed to a relatively large value. Since the low-frequency signal has a longer wavelength, a relatively large distance between the two sound sources will not cause an excessive phase difference in the far field, and further will not form excessive leaked sound in the far field. In order to obtain a relatively small high-frequency far-field sound, the distance between two sound sources in the second set of dual sound sources may be designed to a relatively small value. Since the high-frequency signal has a shorter wavelength, a relatively small distance between the two sound sources may avoid forming a large phase difference in the far field, and further may avoid forming a large leaked sound. The distance between the second set of dual sound sources may be less than the distance between the first set of dual sound sources.

The beneficial effects of the present disclosure may include but are not limited to: (1) The position of the key module **4*d*** on the loudspeaker apparatus may be optimized, and the vibration efficiency may be improved. (2) The sound transmission efficiency of the loudspeaker apparatus may be improved, and the volume may be increased. It should be noted that different embodiments may have different beneficial effects. In different embodiments, the possible beneficial effects may have one or more above described beneficial effects, or may have any other beneficial effects.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer-readable media having computer-readable program code embodied thereon.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A loudspeaker apparatus, comprising:

a pair of ear hooks contacting the left and right ears of a user, respectively; and a pair of loudspeaker components connected to the pair of ear hooks, respectively, each loudspeaker component including a key module and an earphone core for generating sound, wherein two key modules on the pair of loudspeaker components, respectively, are configured to realize different functions according to interactive operations of the user, and a ratio of a mass of the key module to a mass of its corresponding loudspeaker component is not greater than 0.3.

2. The loudspeaker apparatus of claim 1, wherein the loudspeaker is located at a position that does not block or cover ear canals of the user.

3. The loudspeaker apparatus of claim 1, wherein the key module on one of the pair of loudspeaker components implement a function of switching to a next/previous song after being clicked twice.

4. The loudspeaker apparatus of claim 1, wherein the key module on one of the pair of loudspeaker components includes a virtual key whose surface is disposed with a logo.

5. The loudspeaker apparatus of claim 1, wherein the key module on one of the pair of loudspeaker components implements a pause/start function after being clicked once.

6. The loudspeaker apparatus of claim 1, wherein each loudspeaker component includes a housing for accommodating its earphone core, a contact position between the corresponding ear hook and a head of the user includes a contact point; and a distance between a center of the corresponding key module and the contact point is not greater than a distance between a center of the housing and the contact point.

7. The loudspeaker apparatus of claim 6, wherein the center of the corresponding key module or the center of the housing is a center of mass thereof or a center of form thereof.

8. The loudspeaker apparatus of claim 6, wherein the housing includes an outer sidewall away from the head of the user and a peripheral sidewall connected to the outer sidewall, and the outer sidewall is surrounded by the peripheral sidewall.

9. The loudspeaker apparatus of claim 8, wherein the peripheral sidewall includes a first peripheral sidewall disposed along a length direction of the outer sidewall and a second peripheral sidewall disposed along a width direction of the outer sidewall; and the outer sidewall and the peripheral sidewall are connected together to form a cavity that is open at one end and accommodates the earphones core.

10. The loudspeaker apparatus of claim 6, wherein the corresponding key module includes a key and an elastic socket for supporting the key; and a key hole is disposed on the outer sidewall, and the key hole cooperates with the key.

11. The loudspeaker apparatus of claim 6, wherein a connecting part between the corresponding ear hook and the housing has a central axis, an extension line of the central axis has a projection on a plane on which an outer side surface of the corresponding key module is located, and an included angle between the projection and a long axis direction of the key module is less than 10°.

12. The loudspeaker apparatus of claim 11, wherein the long axis direction and a short axis direction of the outer side surface of the corresponding key module have an intersection, the projection and the intersection have a shortest distance, and the shortest distance is less than a size of the outer side surface of the corresponding key module in the short axis direction.

13. The loudspeaker apparatus of claim 1, wherein the earphone core at least includes a composite vibration component composed of a vibration board and a vibration conductive plate.

14. The loudspeaker apparatus of claim 13, wherein the earphone core further includes at least one voice coil and at least one magnetic circuit system; and the at least one voice coil is physically connected to the vibration board, and the at least one magnetic circuit system is physically connected to the vibration conductive plate.

15. The loudspeaker apparatus of claim 14, wherein a stiffness coefficient of the vibration board is greater than a stiffness coefficient of the vibration conductive plate.

16. The loudspeaker apparatus of claim 6, wherein the housing further includes at least one contact area, and the contact area is at least partially in contact with the user directly or indirectly, wherein the contact area has a gradient structure so that a pressure distribution on the contact area is uniform.

17. The loudspeaker apparatus of claim 16, wherein the gradient structure includes at least one hump or at least one groove.

18. The loudspeaker apparatus of claim 16, wherein the gradient structure is located at a center or an edge of the at least one contact area.

19. The loudspeaker apparatus of claim 1, comprising a voice control system configured to receive and execute voice control instructions.

* * * * *